United States Patent
Lee et al.

(10) Patent No.: US 10,055,059 B2
(45) Date of Patent: Aug. 21, 2018

(54) MOBILE TERMINAL AND METHOD FOR CONTROLLING THE SAME

(71) Applicant: LG ELECTRONICS INC., Seoul (KR)

(72) Inventors: Suyoung Lee, Seoul (KR); Yongjae Kim, Seoul (KR); Yoonchan Won, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 15/353,841

(22) Filed: Nov. 17, 2016

(65) Prior Publication Data

US 2018/0011597 A1 Jan. 11, 2018

(30) Foreign Application Priority Data

Jul. 5, 2016 (KR) ........................ 10-2016-0085030

(51) Int. Cl.
| | |
|---|---|
| *G06F 3/046* | (2006.01) |
| *G06F 3/041* | (2006.01) |
| *G06F 3/0484* | (2013.01) |
| *G06F 3/0481* | (2013.01) |
| *G06F 3/0488* | (2013.01) |
| *G06F 3/0354* | (2013.01) |

(52) U.S. Cl.
CPC ............ *G06F 3/0418* (2013.01); *G06F 3/046* (2013.01); *G06F 3/04817* (2013.01); *G06F 3/04842* (2013.01); *G06F 3/04883* (2013.01); *G06F 3/03545* (2013.01); *G06F 2203/04108* (2013.01)

(58) Field of Classification Search
CPC ............... G06F 3/0418; G06F 3/04883; G06F 3/04842; G06F 3/046; G06F 3/04817; G06F 2203/04108; G06F 3/03545
See application file for complete search history.

(56) References Cited

U.S. PATENT DOCUMENTS

| | | | | |
|---|---|---|---|---|
| 9,509,361 | B1 * | 11/2016 | Kuhl | ................. H04N 5/2252 |
| 2013/0311952 | A1 * | 11/2013 | Nakagawa | ......... H04N 5/23216 |
| | | | | 715/849 |
| 2013/0342491 | A1 | 12/2013 | Liu et al. | |
| 2014/0055399 | A1 * | 2/2014 | Lee | ......................... G06F 3/03 |
| | | | | 345/173 |

(Continued)

FOREIGN PATENT DOCUMENTS

| | | |
|---|---|---|
| EP | 2703985 A1 | 3/2014 |
| EP | 2806342 A1 | 11/2014 |

*Primary Examiner* — Premal R Patel
(74) *Attorney, Agent, or Firm* — Birch, Stewart, Kolasch & Birch, LLP

(57) ABSTRACT

An electronic device including a touch screen configured to display at least one graphic object for executing an operation on the electronic device; at least first and second magnetic sensors configured to detect a spatial position of an input device having a magnetic field generating unit; and a controller configured to in response to a touch applied to the graphic object using the input device for executing the operation, execute a hold mode of holding the execution of the operation while the spatial position of the input device is moved away from the touch screen while being maintained within a reference range, and release the hold mode and execute the operation when the spatial position of the input device is moved out of the reference range.

18 Claims, 22 Drawing Sheets

(56) References Cited

U.S. PATENT DOCUMENTS

| | | | |
|---|---|---|---|
| 2014/0128131 A1* | 5/2014 | Sin .................. | H04M 1/185 |
| | | | 455/575.8 |
| 2014/0327659 A1* | 11/2014 | Chen .................. | G06F 3/046 |
| | | | 345/179 |
| 2017/0013108 A1* | 1/2017 | Penke ............... | H04M 1/72527 |

* cited by examiner

MOBILE TERMINAL AND METHOD FOR CONTROLLING THE SAME

CROSS-REFERENCE TO THE RELATED APPLICATIONS

Pursuant to 35 U.S.C. § 119(a), this application claims the benefit of an earlier filing date of and the right of priority to Korean Application No. 10-2016-0085030, filed on Jul. 5, 2016, the contents of which are incorporated by reference herein in its entirety.

BACKGROUND OF THE INVENTION

1. Field of the Invention

This specification relates to a mobile terminal executing an input operation using an input device, and a method for controlling the same.

2. Background of the Invention

Terminals may be divided into mobile/portable terminals and stationary terminals. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player. As an example of such function, to input a control command on a display of a terminal, a user can write using a tool such as a stylus pen without a direct touch with a finger. When such writing or the like is executed using the tool, a position of the tool is recognized based on a sensor provided on the mobile terminal and an input applied to the display.

Meanwhile, when intentionally performing an input to the terminal using the tool or a touch applied with a hand, once such input is applied, a result of the input is output even though the input is incorrect. Therefore, after the input is applied, even though the input is found incorrect or a user desires to change the input, the user should perform a complicated procedure, such as waiting for the input result, taking an action of going back to a previous screen, and performing a re-input, which causes the user's inconvenience. In addition, after the input result is output, even though an incorrect input such as a typographic error is found, the user should perform a complicated procedure of going back to a previous screen and performing a re-input, which also causes the user's inconvenience.

SUMMARY OF THE INVENTION

Therefore, an aspect of the detailed description is to provide a mobile terminal, capable of checking an operation to be executed before an execution of an operation corresponding to an input applied on a touch screen using an input tool even after such input is applied, and a method for controlling the same.

Another aspect of the detailed description is to provide a mobile terminal, capable of changing, adding and canceling an operation corresponding to an input applied on a touch screen using an input tool before an execution of the operation corresponding to the input even after the input is applied; and a method for controlling the same.

To achieve these and other advantages and according to an embodiment of the this specification, as embodied and broadly described herein, there is provided a mobile terminal including a touch screen to output at least one object and detect a touch applied to the object, a sensing unit to detect a spatial position of an input device using a plurality of magnetic sensors, the input device having a magnetic field generating unit, and a controller to execute a hold mode of putting on hold an execution of an operation corresponding to the touch while the spatial position of the input device is moved away from a touch point of the touch based on the touch screen and then detected within a reference range. Also, the controller may terminate the hold mode and execute the operation corresponding to the touch, which has been put on hold, when the spatial position of the input device is out of the reference range.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

A singular representation may include a plural representation unless it represents a definitely different meaning from the context. Terms such as "include" or "has" are used herein and should be understood that they are intended to indicate an existence of features, numbers, steps, functions, several components, or combinations thereof, disclosed in the specification, and it is also understood that greater or fewer features, numbers, steps, functions, several components, or combinations thereof may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Figure 1A:
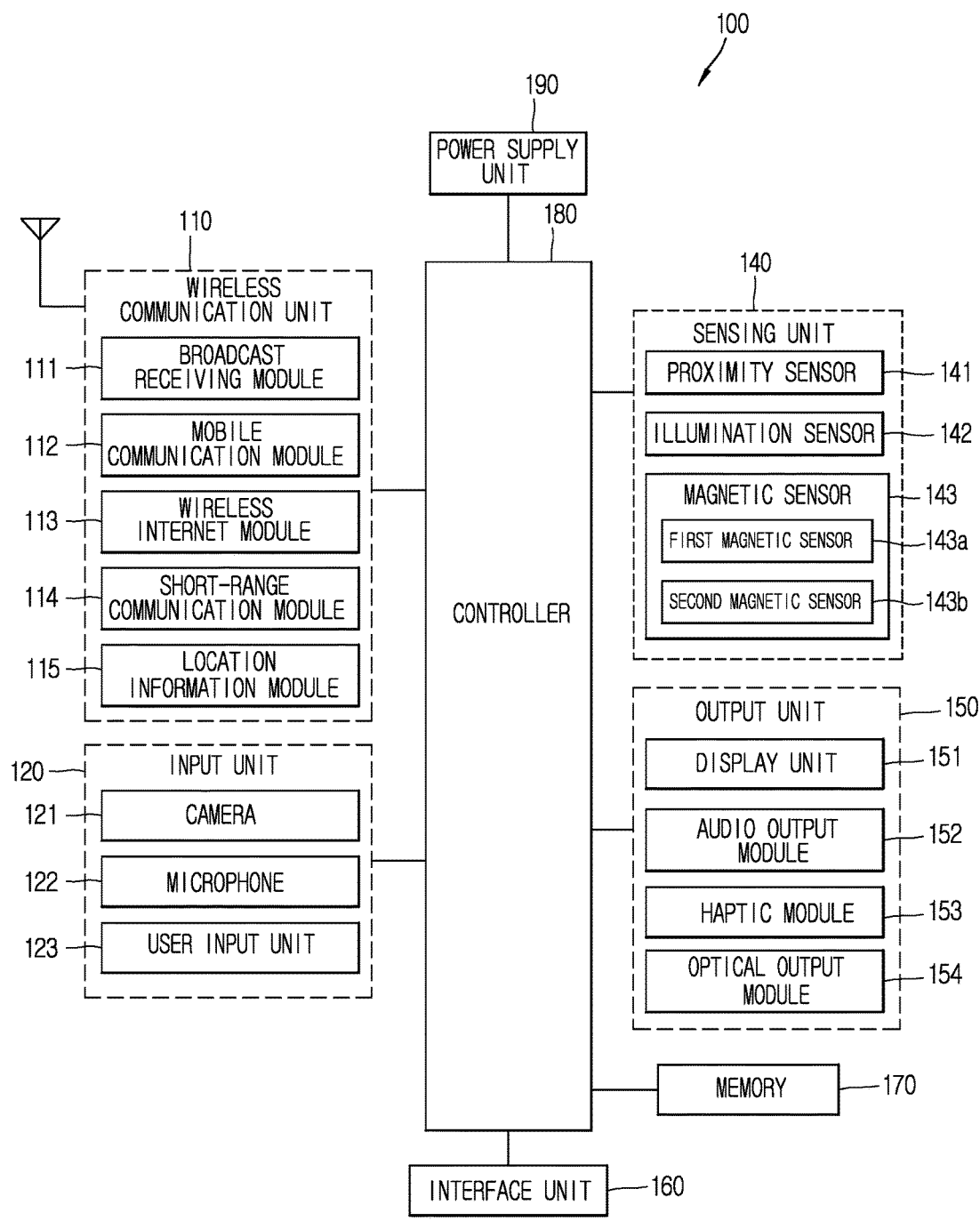
FIG. 1A is a block diagram of a mobile terminal according to an embodiment of the present invention.
Figure 1B:
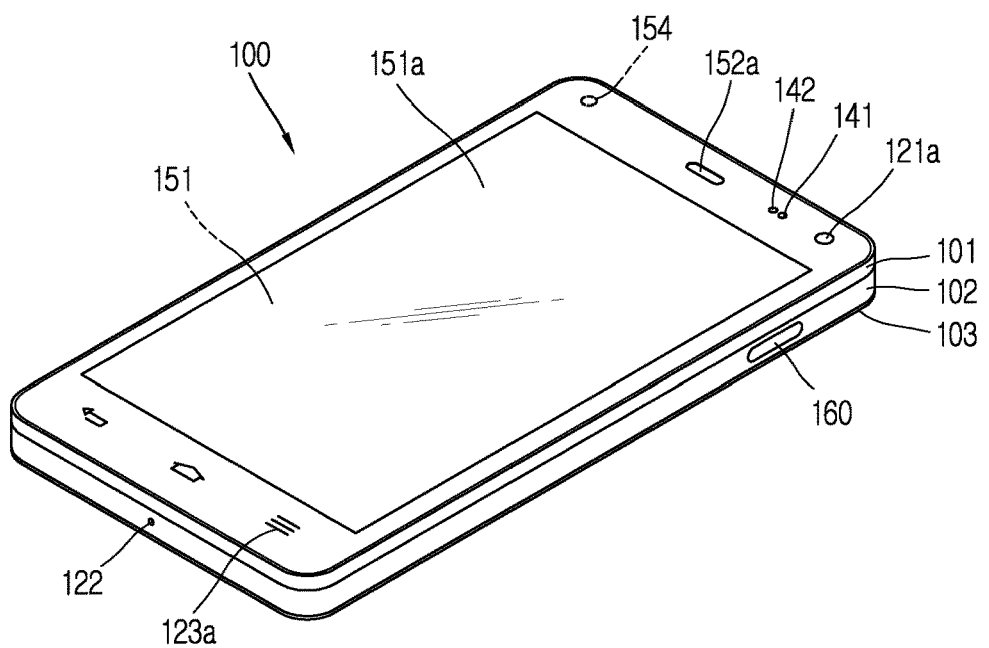
FIGS. 1B and 1C are conceptual views illustrating one example of a mobile terminal, viewed from different directions.
Figure 1C:
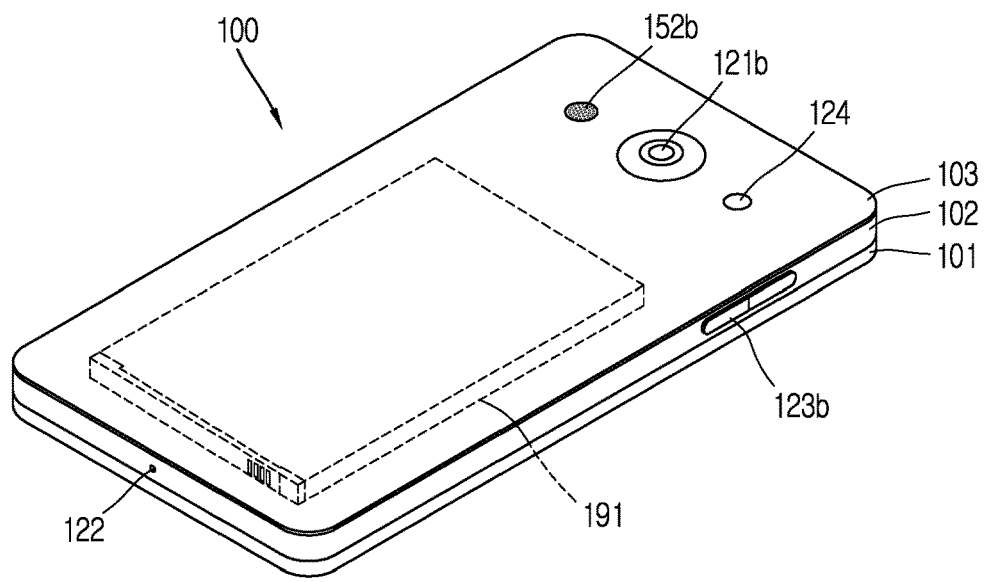

Reference is now made to FIGS. 1A-1C, where FIG. 1A is a block diagram of a mobile terminal according to an embodiment of the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

The wireless communication unit 110 includes one or more of a broadcast receiving module 111, a mobile communication module 112, a wireless Internet module 113, a short-range communication module 114, and a location information module 115.

The input unit 120 includes a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) is obtained by the input unit 120 and may be analyzed and processed according to user commands.

The sensing unit 140 is typically implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 is typically configured to output various types of information, such as audio, video, tactile output, and the like. The output unit 150 is shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 can perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 may be understood as a type of the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 100. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

A magnetic sensor 143 refers to a sensor that detects presence or absence of an object, which is approaching a predetermined detection surface or exists near the detection surface, and a position and orientation of the corresponding object, using force of a magnetic field. That is, the magnetic sensor 143 refers to a sensor of measuring a magnitude and orientation of a surrounding magnetic field or magnetic flux line. In the present invention, the mobile terminal 100 can be provided with at least some three-axis magnetic sensors 143a and 143b to more accurately detect a position and orientation of an object generating a magnetic field.

Thus, the plurality of three-axis magnetic sensors 143a and 143b are provided in an independent manner, and disposed in different directions with being spaced apart from each other by a predetermined distance. Accordingly, the controller 180 can perform a different processing operation according to a magnitude of a magnetic field value measured by the plurality of magnetic sensors 143a and 143b. In more detail, a position, an orientation, an angle and the like of an object that generates a magnetic field may be detected according to a magnitude of a magnetic field value measured by the plurality of three-axis magnetic sensors 143a and 143b.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched region, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, can calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors (TR) at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the flexible display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 can include message reception, call signal reception, a missed call, an alarm, a schedule alarm, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 can also be operated in relation to a network storage device that performs the storage function of the memory 170 over a network, such as the Internet.

The controller 180 can typically control an operation associated with an application program and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected. As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type the body of the portable electronic device. However, the mobile terminal 100 can alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of portable electronic device. However, such teachings with regard to a particular type of portable electronic device will generally apply to other types of mobile terminals as well.

The body of the mobile terminal may be understood to indicate the mobile terminal 100 by regarding the mobile terminal 100 as at least one assembly. The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b as shown in FIG. 1C.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 can be configured such that one case forms the inner space. In this example, a mobile terminal 100 having a uni-body is formed so synthetic resin or metal extends from a side surface to a rear surface.

If desired, the mobile terminal 100 can include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 can include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided at the rear surface of the terminal body, a new type of user interface using this may be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 can include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

As shown in FIG. 1C, a second camera 121b is located at the rear side of the terminal body and includes an image capturing direction that is substantially opposite to the image capturing direction of the first camera unit 121a. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject. The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 can include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 can be provided. The cover or pouch may cooperate with the display unit 151 to extend the function of the mobile terminal 100. Another example of the accessory is a touch pen for assisting or extending a touch input to a touch screen.

Hereinafter, description will be given of embodiments related to a control method which can be implemented in the mobile terminal having such configuration, with reference to the accompanying drawings. It will be obvious to those skilled in the art that the present invention can be specified into other specific forms without departing from the scope and essential features of the present invention.

Figure 2A:
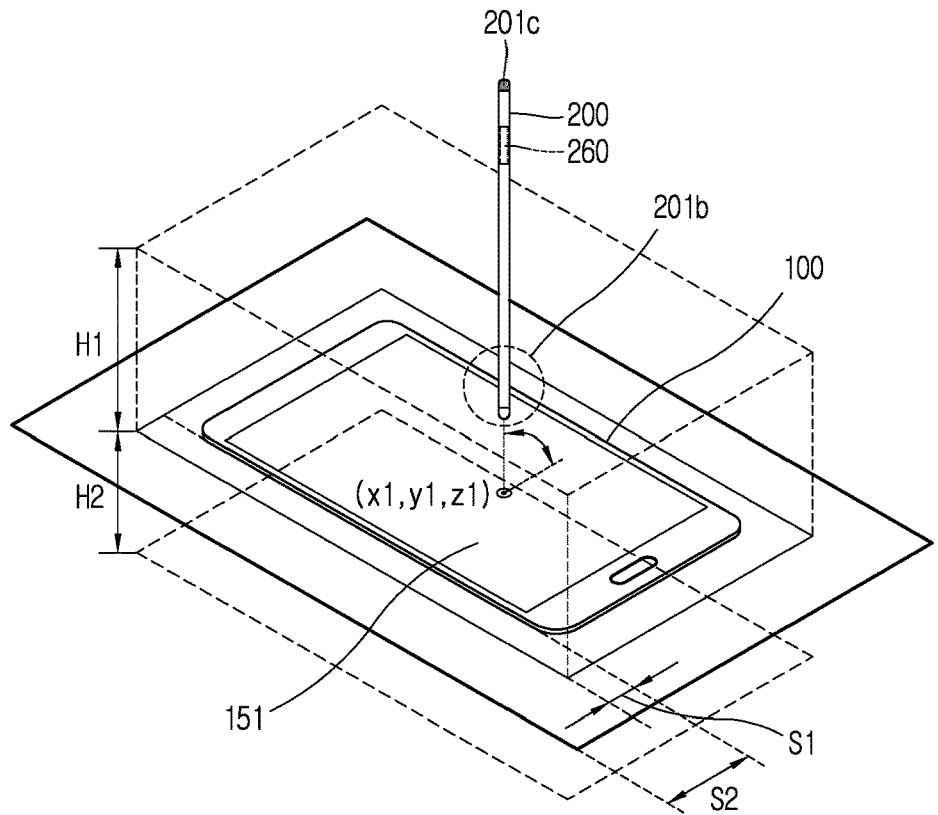
FIGS. 2A and 2B are views of sensing (detecting) a spatial position of an input device using a plurality of magnetic sensors in a mobile terminal according to an embodiment of the present invention.
Figure 2B:
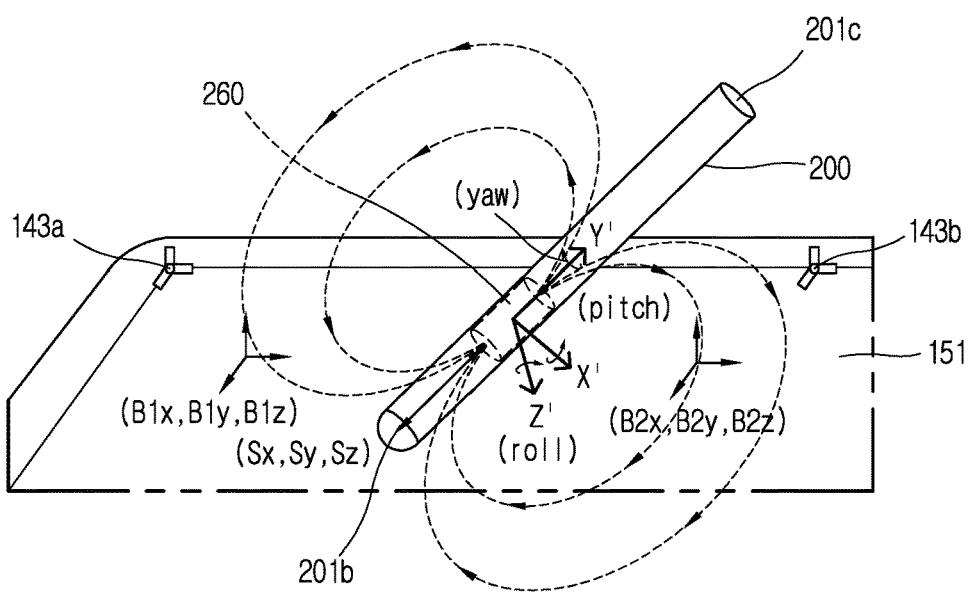

First, FIGS. 2A and 2B are views of detecting (sensing) a spatial position of an input device using a plurality of magnetic sensors in a mobile terminal according to an embodiment of the present invention. As illustrated in FIGS. 2A and 2B, the mobile terminal 100 can recognize a contact point Sx, Sy, Sz of an input device 200 on the touch screen 151 or a spatial position x1, y1, z1 near the mobile terminal 100 within a reference range out of the touch screen 151, using a plurality of three-axis magnetic sensors 143a and 143b. The three-axis magnetic sensors 143a and 143b, as illustrated in FIG. 2B, may be disposed near corners of one side of the mobile terminal 100 while being spaced apart from each other.

Each of the three-axis magnetic sensors 143a and 143b can measure magnitudes of magnetic fields generated in a right angle direction to one another. For example, the first magnetic sensor 143a can acquire magnetic field values $B1x$, $B1y$ and $B1z$ by measuring magnitudes of magnetic fields around it in x, y and z-axial directions, and the second magnetic sensor 143b can acquire magnetic field values $B2x$, $B2y$ and $B2z$ by measuring magnitudes of magnetic fields around it in the x, y and z-axial directions. Based on the acquired magnetic field values $B1x$, $B1y$, $B1z$, $B2x$, $B2y$ and $B2x$, position, orientation and angle of the input device 200 which generates the magnetic fields can be detected.

Thus, a magnetic field generating unit 260, for example, a dipole magnet which generates a magnetic field is disposed in an inner space of the input device 200. The magnetic field generating unit 260 can be installed such that a central axis of rotation of the input device 200 coincides with a Y' axis (see FIG. 2B) of the dipole magnet. In this instance, the position and orientation of the magnetic field generating unit 260 may be expressed by 5 degrees of freedom, namely, central positions (x, y and z) of the dipole magnet and rotational angles (roll and pitch) with respect to X' and Z' axes which are independent of the Y' axis. Here, a rotation yaw of the input device 200 and the magnetic field generating unit 260 centering on the Y' axis does not make a difference in the magnetic field sensor value of the magnetic field generating unit 260.

Also, in the present invention, six magnetic field values can be obtained through the plurality of three-axis magnetic sensors, and thus the position, orientation and angle of the magnetic field generating unit 260 having such 5 degrees of freedom can be specified. In addition, a nonlinear function which describes a correlation among the spatial position of the input device 200 and the magnetic field values B1x, B1y, B1z, B2x, B2y and B2z, which correspond to the values of the degrees of freedom of the central positions x, y and z and the rotational angles roll and pitch of the magnetic field generating unit 260 can be pre-stored in the mobile terminal 100 in a software configuration.

Also, in one example, to sense the spatial position of the input device 200, more sensors, such as an acceleration sensor, a gyroscope, a camera and the like, may be used in addition to the three-axis magnetic sensors. When the magnetic field values obtained through the plurality of three-axis magnetic sensors are transferred to the controller 180, the controller 180 can recognize the spatial position of the input device 200 and perform an output associated with the touch screen 151.

Also, FIG. 2A illustrates recognition ranges H1, H2, S1 and S2 of the spatial position of the input device 200 sensed near the mobile terminal 100. In more detail, the spatial position of the input device 200 including the magnetic field generating unit 260 therein can be detected within an upper space H1, a lower space H2 and side spaces S1 and S2 (hereinafter, referred to as 'reference range') based on the touch screen 151 of the mobile terminal 100. For example, even when the input device 200 is located near a rear surface of the mobile terminal 100 within the reference range, the controller 180 can output an indication corresponding to the spatial position of the input device 200 on the touch screen 151.

Hereinafter, recognizing the spatial position of the input device 200 may also be understood as recognizing a hovering input by the input device 200. In this instance, the width, height, size and the like of the reference range may differ according to a magnitude of the magnetic field generated in the magnetic field generating unit 260 provided in the input device 200, for example, a strength of the magnetic field of the dipole magnet. For example, when the magnetic field of the dipole magnet has a higher strength, the recognition range of the spatial position of the input device 200 may extend more.

Meanwhile, as illustrated in FIG. 2B, when one end portion 201b of the input device 200 opposite the other end portion 201c is brought into contact with one point of the touch screen 151, a position Sx, Sy, Sz pressed by the one end portion 201b can be detected by the touch screen 151. In this instance, the position, orientation and angle of the input device 200 can accurately be measured merely by one three-axis magnetic sensor. Also, while writing on the touch screen 151 with the input device 200, the controller 180 can distinguish a touch applied by a hand and ignore such touch.

Also, in the present invention, a calibration process for removing/considering a magnetic field (hereinafter, referred to as 'environmental magnetic field') generated due to noise and the like, which are caused by a magnetic field of the Earth, a sensor offset, an AC power source line near the mobile terminal and the like, is merely executed once at the beginning. In more detail, a changed value of the magnetic field is measured based on magnetic field values corresponding to the initial position, orientation and angle of the input device 200, which are sensed through the plurality of three-axis magnetic sensors. Therefore, even though the spatial position of the input device 200 changes, an additional calibration is not needed.

Figure 3A:
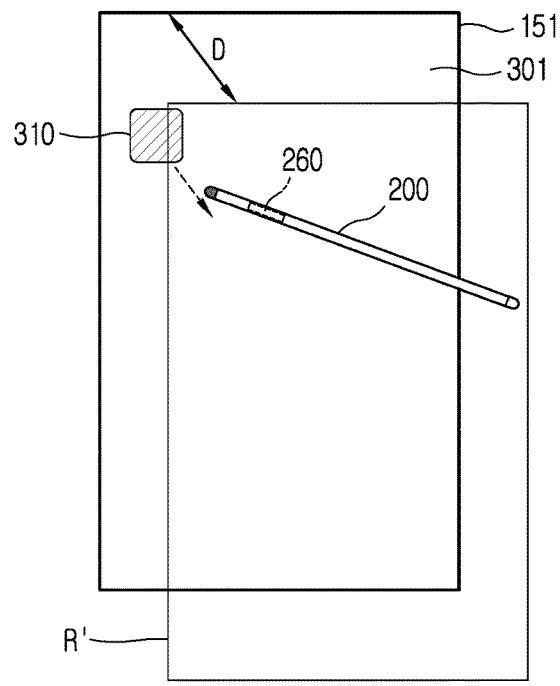
FIGS. 3A, 3B and 3C are exemplary views of executing a specific operation based on a spatial position of an input device in a mobile terminal according to an embodiment of the present invention.
Figure 3B:
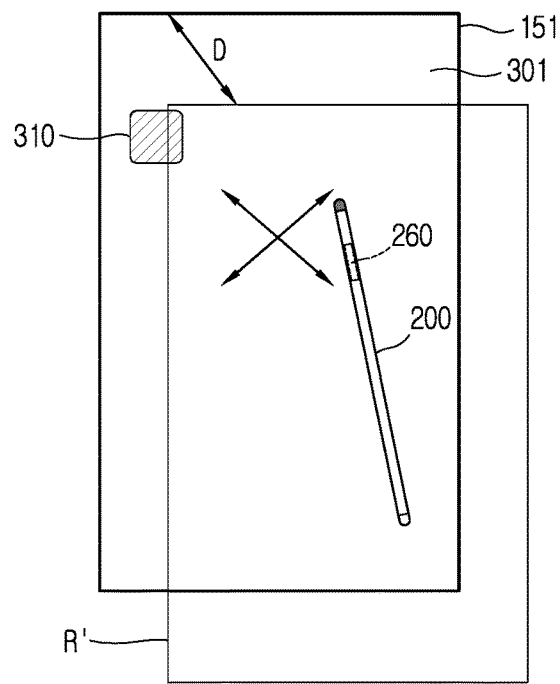
Figure 3C:
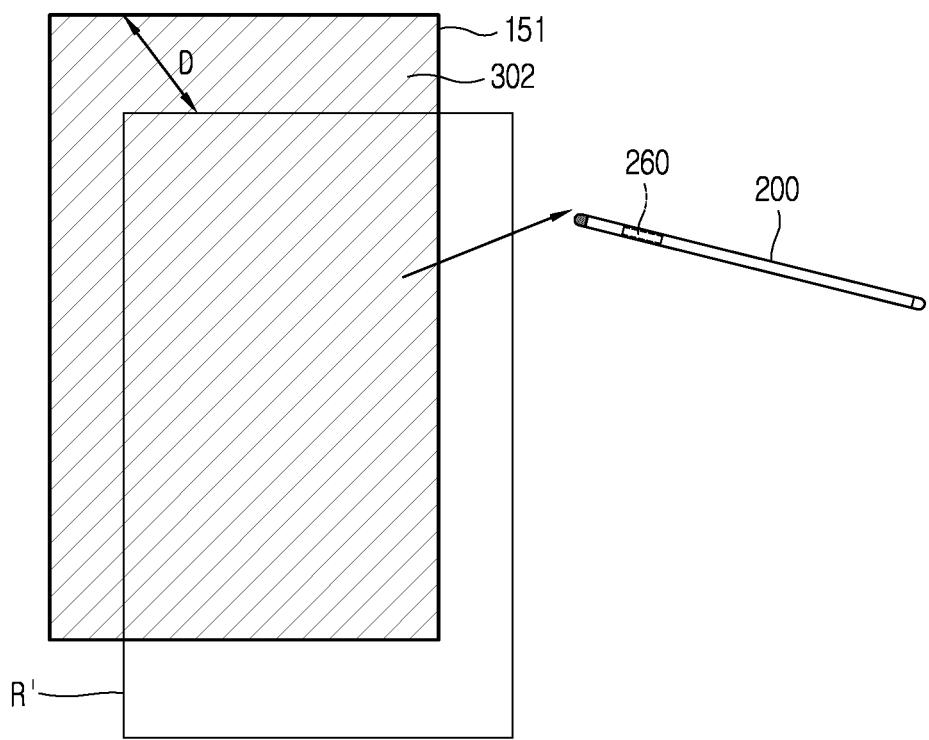

Next, FIGS. 3A, 3B and 3C are exemplary views of executing a specific operation based on a spatial position of the input device 200 in the mobile terminal according to an embodiment of the present invention. First, as illustrated in FIG. 3A, when the input device 200 having the magnetic field generating unit 260 therein is brought into contact with one point of a screen 301 of the touch screen 151 and then moved away from the touch screen 151 in the Z-axial direction, the mobile terminal 100 can detect the spatial position of the input device 200 using the plurality of three-axis magnetic sensors 143a and 143b.

Also, the mobile terminal 100 can continuously detect movement (including a moving distance and a moving direction), inclination and rotation of the input device 200 within the reference range using the plurality of three-axis magnetic sensors 143a and 143b. For example, in FIG. 3A, a spaced distance D from a front surface of the touch screen 151 and a virtual area R' are provided as one method of representing the reference range, but the present invention is not limited to this. The reference range includes every range of a stereoscopic space in which the spatial position of the input device 200 can be recognized by sensing a magnetic field of a dipole magnet included in the magnetic field generating unit 260 built in the input device 200 through the plurality of three-axis magnetic sensors. For example, the reference range includes all of side spaces spaced apart from the touch screen 151, a rear space spaced apart from a rear surface of the touch screen 151 and the like.

Thus, while the input device 200 is detected within the reference range, an execution of an operation corresponding to a touch applied to one point of the touch screen 151 is restricted. That is, an operation to be executed is temporarily in a wait state (standby state or holding state) such that the user can cancel, check and change the operation corresponding to the touch.

In the wait state, when it is sensed that the spatial position of the input device 200 is changed, for example, in response to a movement, inclination or rotation of the input device 200, an associated other operation can be executed. FIG. 3B illustrates an exemplary operation of the input device 200 for executing an operation which is on hold and an associated other operation.

As illustrated in FIG. 3B, when the input device 200 is moved from one point of the one area R' within the reference range to another point, moved from the one area R' to another area within the reference range, rotated from the one area R' omni-directionally or bi-directionally, or inclined by a predetermined angle, the plurality of magnetic sensors 143a and 143b can detect the change in the spatial position of the input device 200 and generate a corresponding control command. In this instance, the control command may be related to the operation in the wait state. Also, the control command may immediately be executed, unlike the operation in the wait state.

Next, a method of executing the operation which is in the wait state is illustrated in FIG. 3C. As illustrated in FIG. 3C, when the input device 200 is moved out of a range (e.g., R') where the spatial position of the input device 200 is recognizable, the wait state is ended and the execution of the operation which has been put on hold is started. That is, when the input device 200 is moved not to recognize a hovering input, the operation which has been put on hold is then executed. Accordingly, a screen change 302 corresponding to an execution result of the operation is output on the touch screen 151.

In addition, moving the spatial position of the input device 200 from the touch screen 151 in the Z-axial direction can be expressed as 'pulling the input device 200,' hereinafter. The mobile terminal 100 according to this embodiment of the present invention can output at least one object on the touch screen 151 and detect a touch applied to the object. Also, the plurality of magnetic sensors 143a and 143b provided in the mobile terminal 100 can detect the spatial position of the input device 200 having the magnetic field generating unit 160.

Here, the object is a visual graphic object having various shapes for executing at least one function, for example, may include a menu, an item, text, an image and an input area. Also, the at least one function is not limited to a specific kind of function that is mapped through the medium of the object, but includes all of a simply selection of an object, and a generation of a screen change according to the selection.

Also, the touch detected through the touch screen 151 includes all of a touch applied by a hand and a touch applied by the input device 200. Here, the spatial position of the input device 200 can be expressed by values (x-axial value, y-axial value and z-axial value) that are calculated based on changes in the magnetic field values detected by the plurality of three-axis magnetic sensors, based on a touch point of the touch applied to the touch screen 151 of the mobile terminal 100. Also, the controller 180 can store an initial magnetic field value at a spatial position corresponding to an initial touch point of the input device 200, and then continuously detect the spatial position, orientation, angel (inclined degree) and the like of the input device 200 based on the changes in the magnetic field values.

Thus, when the spatial position of the input device 200 is moved away from the touch point of the touch based on the touch screen 151 of the mobile terminal 100 and then detected within the reference range, a hold mode of waiting for an execution of an operation corresponding to the touch is executed. The hold mode can be continuously maintained while the spatial position of the input device 200 is detected within the reference range (or a range of allowing recognition of a hovering input).

Meanwhile, when the spatial position of the input device 200 is out of the reference range, the controller 180 can end the hold mode and start the execution of the operation corresponding to the touch, which has been put on hold. Thus, according to an embodiment of the present invention, the operation corresponding to the touch applied to the touch screen 151 through the input device 200 is not immediately executed.

In more detail, the mobile terminal 100 according to an embodiment of the present invention puts on hold an execution of an operation corresponding to a touch applied by the input device 200 while the input device 200 is located within the reference range, and then executes the operation on hold at the time point that the input device 200 is out of the reference range. As such, by temporarily holding the operation corresponding to the touch, the user can check the operation corresponding to the touch and then execute various additional operations after the check.

Figure 4:
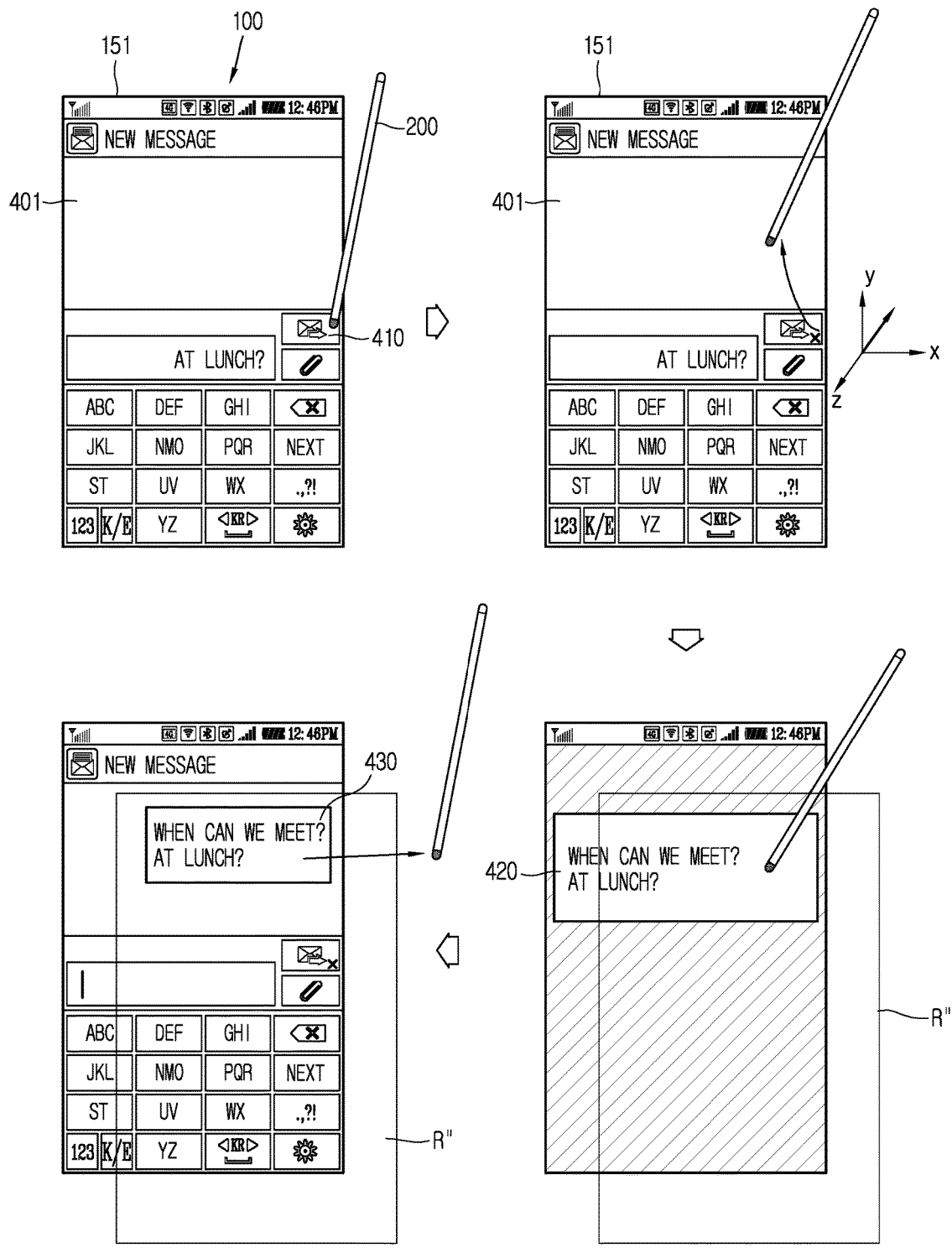
FIG. 4 is a conceptual view illustrating a representative operation of a mobile terminal according to an embodiment of the present invention.

Hereinafter, FIG. 4 is a conceptual view illustrating a representative operation of the mobile terminal 100 according to an embodiment of the present invention. As illustrated in FIG. 4, a message writing screen 401 for writing a message is output on the touch screen 151 of the mobile terminal 100. After writing a message, when a touch is applied to a transmit icon 410 for transmitting the message using the input device 200 and then moved in the Z-axial direction of moving away from the front surface of the touch screen 151, a hold mode of putting on hold the transmission of the written message is activated. That is, the touch applied to the transmit icon 410 is released but the execution of the message transmission is restricted.

Upon entering the hold mode, as illustrated in FIG. 4, a preview image 420 of the message to be transmitted is popped up in a form of a window. Accordingly, the user can check in advance the full text of the message (e.g., "When can we meet?," "At lunch?") to be transmitted before the message is actually transmitted. In this instance, the previously-output message writing screen 401 may output thereon a visual indication notifying an inactive state of restricting an input of a control command, for example, output a shadowing effect, an opacity effect and the like.

The preview image 420 can continuously be output during the hold mode. Also, the hold mode can be maintained while the spatial position of the input device 200 is located within a range recognizable through the plurality of magnetic sensors, namely, the reference range. Thus, a graphic object notifying the spatial position of the input device 200, for example, a pointer object that is moved along the change of the spatial position of the input device 200 can be output on a corresponding point of the touch screen 151. In this instance, when the spatial position of the input device 200 is moved close to or away from the touch screen 151, the size, shape, color, transparency and the like of the pointer object can be output in different manners.

Upon a complete check of the message to be transmitted, when the input device 200 is moved away from the touch screen 151 outside of the reference range, the message corresponding to the preview image 420 is transmitted to a counterpart terminal. That is, the message is transmitted at the time point that the input device 200 is out of the reference range or the spatial position of the input device 200 is not detected any more by the plurality of magnetic sensors 143a and 143b.

Accordingly, the message writing screen which was in the inactive state is automatically switched into an active state allowing the input of the control command, and the transmitted message is output on the screen 430. As such, even though a touch applied to an object is released, an execution of an operation associated with the object may be put on hold according to the spatial position of the input device 200, thereby providing the user with one more chance to check the related operation.

Figure 5:
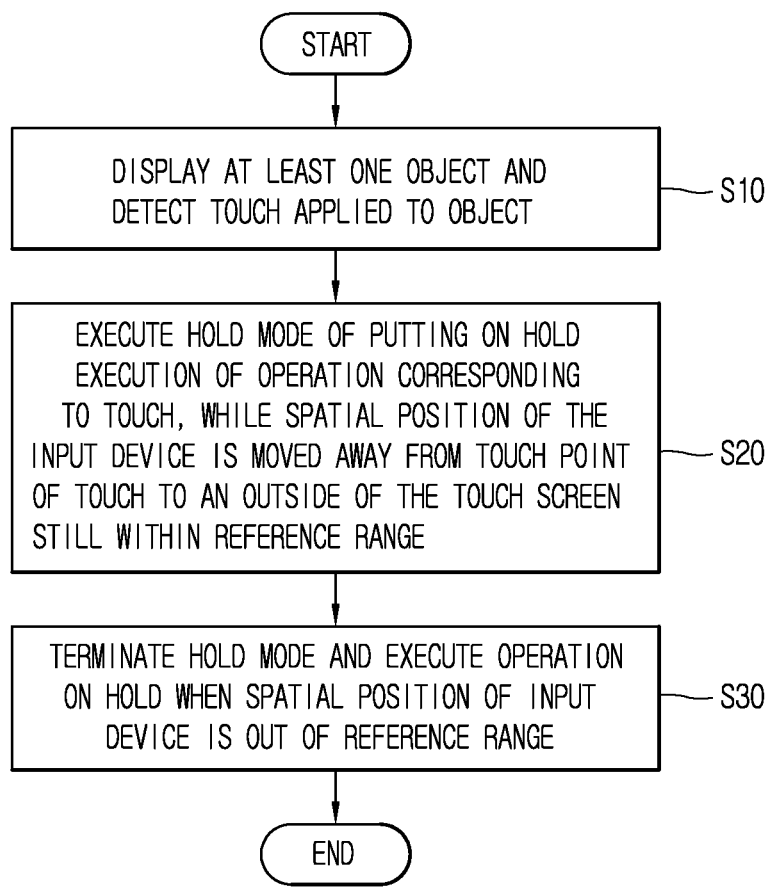
FIG. 5 is a flowchart illustrating the operation of FIG. 4.

Next, FIG. 5 is a flowchart illustrating the operation of FIG. 4. First, when at least one object is output on the touch screen 151 of the mobile terminal 100, a touch applied to the object is detected (S10). Here, the object output on the touch screen 151, as aforementioned, is a graphic object in various shapes for executing at least one function, and includes a menu, an icon (an execution icon, an icon of an application, etc.), a (selectable) item, text (within a document), an image and an input area. Also, the at least one function is not limited to a specific kind of function that is mapped through the medium of the object, but includes all of a simply selection of an object, and a generation of a screen change according to the selection.

Next, when the spatial position of the input device 200 having the magnetic field generating unit is moved away from a touch point of the touch and then detected within the reference range, the controller 180 executes a hold mode for putting on hold an execution of an operation corresponding to the touch (S20). Here, the touch point of the touch is detected through the touch screen 151, and the spatial position of the input device 200 is detected through the plurality of three-axis magnetic sensors provided in the mobile terminal 100.

When the hold mode is executed, the controller 180 can display a window, on which information related to the operation corresponding to the touch is output, on the touch screen 151. In this instance, the information output on the touch screen 151 may be a preview image appearing upon executing the operation corresponding to the touch applied to the touch screen 151 or detailed information related to the operation.

When the hold mode is executed, the controller 180 can control the touch screen 151 to output a visual effect of indicating a screen change, which notifies that the hold mode has been executed, for example, indicating an inactive state of a previously-output screen, or output a notification icon notifying the hold mode or a transmit icon on one area of the touch screen 151.

In addition, the plurality of three-axis magnetic sensors provided in the mobile terminal 100 can continuously detect the spatial position, the movement (a moved degree and a moving direction), an inclination (an inclined angle and a changed degree of the angle), and a rotation (a rotated degree and a rotating direction) of the input device 200 even in the hold mode, and provide the detection result to the controller 180. The controller 180 can then continuously calculate coordinate values (x-axial value, y-axial value and z-axial value) of the input device 200 corresponding to the detection result.

In this instance, the controller 180 can output a graphic object notifying the spatial position of the input device 200, for example, a pointer object which moves or changes along the movement of the input device 200, on a screen of the hold mode, during the hold mode. For example, when the spatial position of the input device 200 is moved only in the X-axial or Y-axial direction within the reference range, the pointer object in the same shape that moves in response to the movement of the input device 200 may be output on the touch screen 151.

Further, when the spatial position of the input device 200 is moved by including the movement in the Z-axial direction with the reference range, the image of the pointer object that moves in response to the movement of the input device 200 may differ. For example, when the spatial position of the input device 200 is moved in the Z-axial direction of moving away from the touch screen 151, the controller 180 can output the pointer object in a blurred manner or by reducing a size of the point object in proportion to a moving distance.

Also, as one example, the image of the pointer object may be a representative image that informs the operation execution of which is currently put on hold. For example, as illustrated in FIG. 4, while an execution of a message transmission is currently on hold, a pointer object in a shape of an envelope image can be output. Also, when an additional operation associated with the operation which is currently put on hold is executed based on the spatial position of the input device 200 during the hold mode, the image of the pointer object can change into a representative image (e.g., a scale image) corresponding to the executed additional operation (e.g., scrolling).

Also, in the hold mode, the controller 180 can control a zoom-out effect to be applied to information related to the operation which is currently put on hold as the spatial position of the input device 200 is moving away from the touch screen 151 based on the Z axis.

Next, when it is determined that the spatial position of the input device 200 is out of the reference range, the controller 180 can execute the operation currently on hold (S30). In more detail, when the spatial position of the input device 200 is not detected any more by the plurality of three-axis magnetic sensors, the controller 180 can determine that the spatial position of the input device 200 has been moved out of the reference range, terminate the hold mode, and then execute the operation which is on hold.

When a pointer object that is moved along the movement of the spatial position of the input device 200 is output in the hold mode, the controller 180 can control the pointer object to disappear from a screen at the moment that the spatial position of the input device 200 is moved out of the reference range.

As such, when the spatial position of the input device 200 is moved out of the reference range, the controller 180 can display a changing or animated image (e.g., an image that a written message is folded like an envelope, etc.) on a popped-up window and/or output a feedback signal, for example, a preset voice, a sound, a vibration, a visual effect, etc. for notifying that the operation corresponding to the touch is to be executed. Accordingly, the user can intuitively recognize that the corresponding operation is going to be executed soon.

Also, in the hold mode of putting on hold the execution of the operation corresponding to the touch, the controller 180 of the mobile terminal 100 can generate another control command associated with the operation while restricting the execution of the operation corresponding to the touch, in response to the spatial position of the input device 200 being moved within the reference range.

Figure 6A:
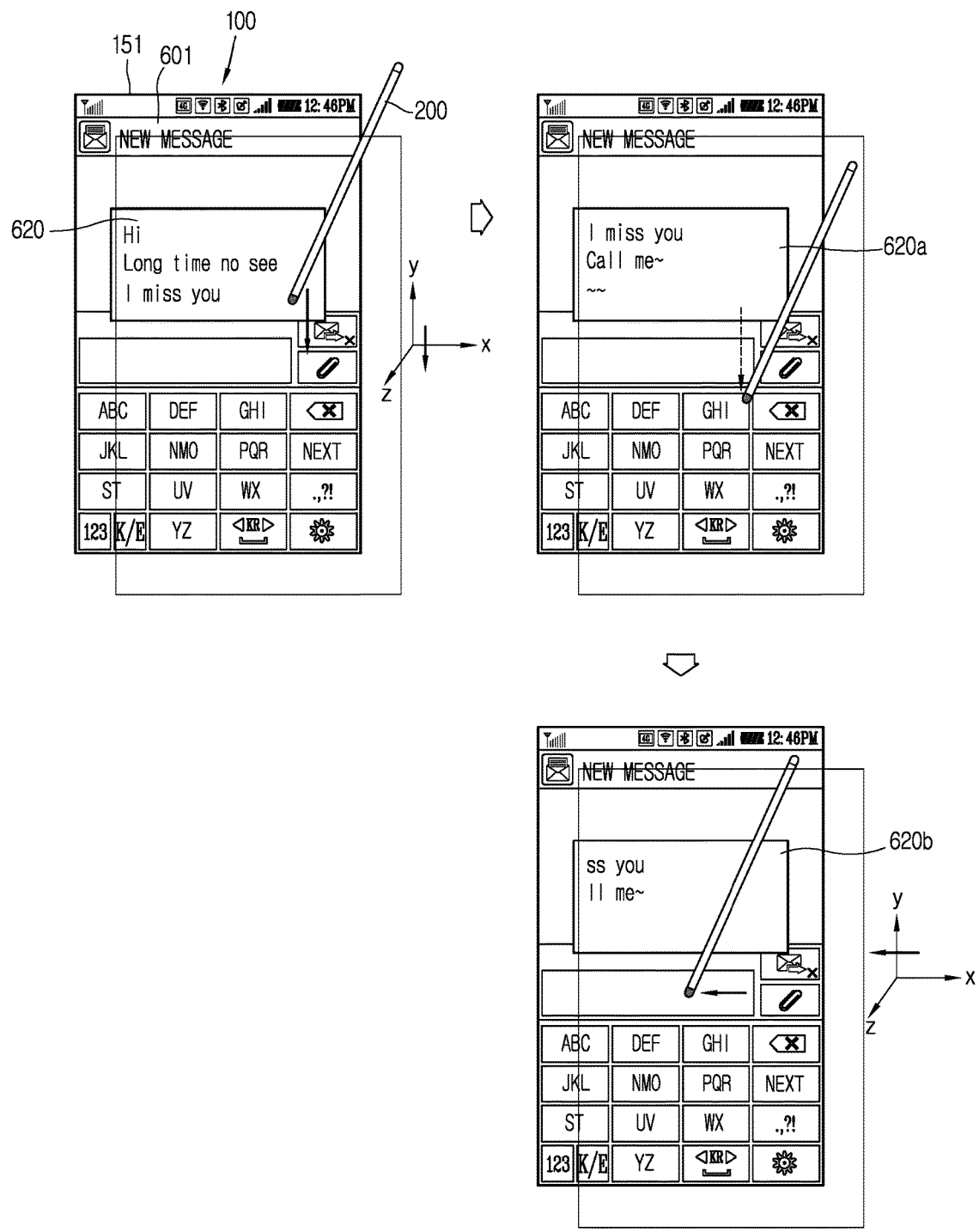
FIGS. 6A, 6B, 6C, 7A, 7B, 8A, 8B, 9, 10A, 10B, 11, 12A, 12B, 13 and 14 are views illustrating various embodiments of putting on hold an execution of a specific operation and then executing the specific operation which is on hold based on a spatial position of an input device in a mobile terminal according to an embodiment of the present invention.

Next, FIG. 6A illustrates an example of executing a scrolling operation as the associated other operation based on the spatial position of the input device 200 in the hold mode of putting on hold the execution of the operation corresponding to the touch. As illustrated in FIG. 6A, a preview image 620 of a message to be transmitted is popped up on a message writing screen 601 ('in an inactive state'), in response to an activation of the hold mode, after a touch input is applied to a message transmission icon.

In this state, when the spatial position of the input device 200 is moved down based on the Y axis, the controller 180 can execute a control command of scrolling down 620*a* information output on the preview image 620 along the moving direction of the input device 200. Accordingly, a message content (e.g., 'Call me') which has not been previously output on the preview image 620 is output on the window. Similar to this, when the spatial position of the input device 200 is moved to left based on the X axis, the controller 180 can execute a control command of scrolling 620*b* the information output on the preview image 620 to left along the moving direction of the input device 200.

Thus, by moving the input device 200 up, down, to left or to right while the preview image 620 of the message to be transmitted is output, the user can easily fast check the full text of the message to be transmitted.

Figure 6B:
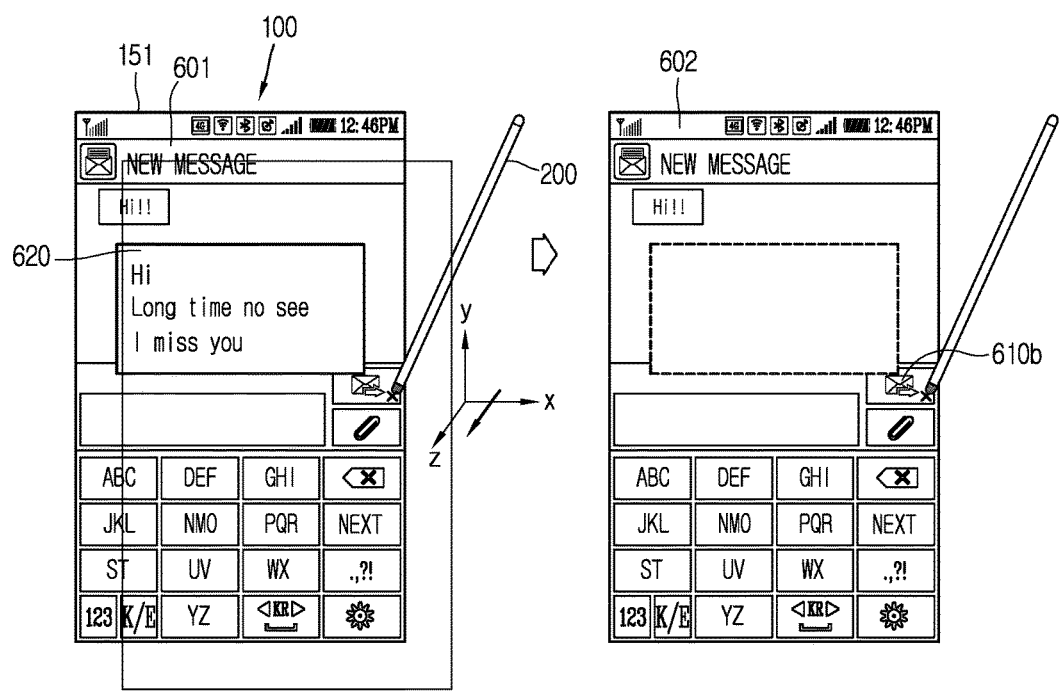
Figure 6B:
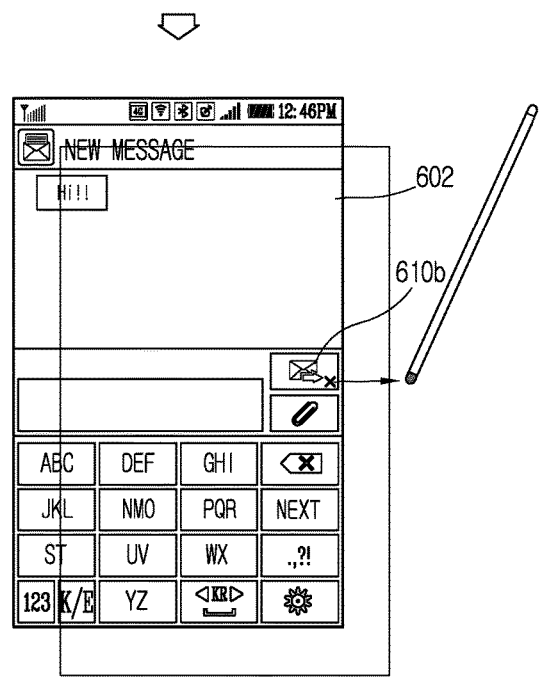

Next, FIG. 6B illustrates an example of executing an operation of canceling an operation on hold using the spatial position of the input device 200. For example, as illustrated in FIG. 6B, when the preview image 620 of the message to be transmitted is output in response to the entrance into the hold mode, and when the spatial position of the input device 200 is moved close to the touch screen 151 to be brought into contact with one point of the touch screen 151, the controller 180 can terminate the hold mode when the operation corresponding to the touch, namely, the message transmission has been cancelled.

In more detail, as the input device 200 is moved close to the touch screen 151 based on the Z axis to be brought into contact with the touch screen 151, the displayed preview image 620 disappears and the hold mode is terminated. In response to the termination of the hold mode, the message writing screen 602 is switched into an active state, and a previously-written message can be output on an input area or temporarily stored without being output.

In this instance, as one embodiment, as illustrated in FIG. 6B, the one point of the touch screen 151 for cancelling the message transmission may be limited using a previously-touched object, namely, the transmit icon 410 (see FIG. 4). Here, as illustrated in FIG. 6B, an image of the previously-touched transmit icon can change into a second icon 610b for executing the transmission cancellation.

Further, when it is detected that the input device 200 is moved in the Z-axial direction of moving away from a touch point of a touch applied to the second icon 610b, the hold mode can be reactivated and a preview image of a message whose transmission is to be cancelled can appear on the touch screen 151.

Figure 6C:
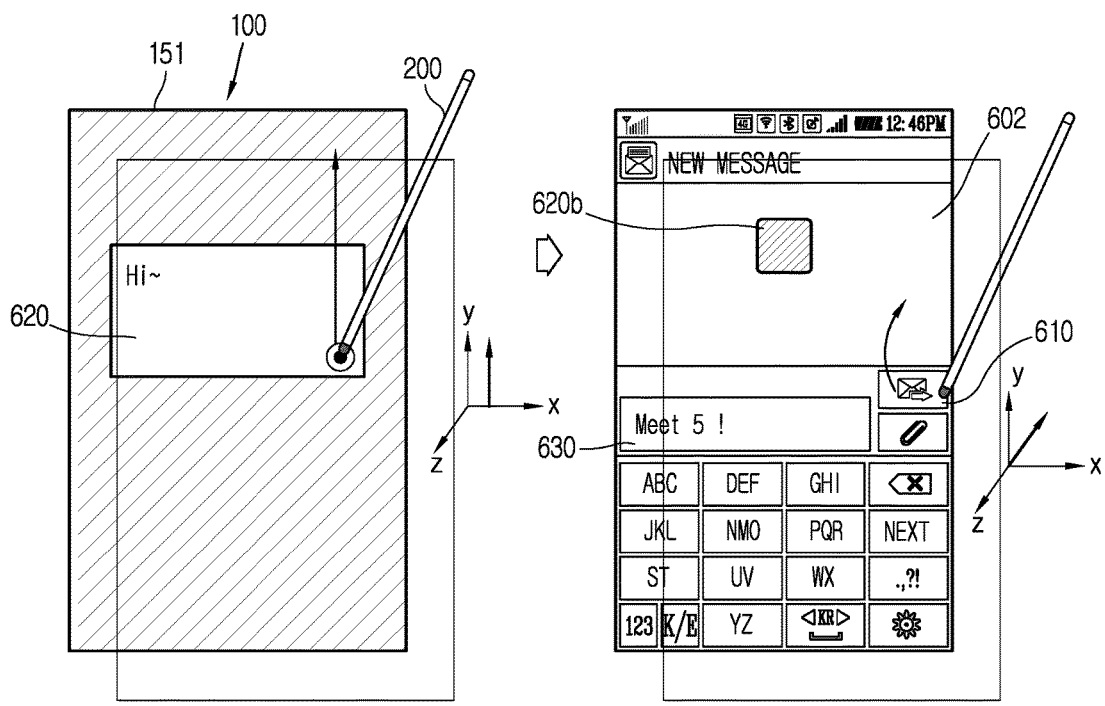
Figure 6C:
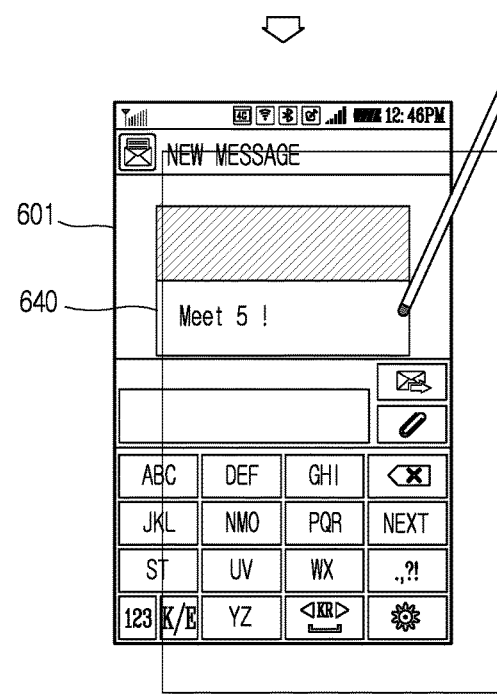

Next, FIG. 6C illustrates one example of executing an operation on hold and an associated additional operation in a merging or combining manner. When there is a content to be added according to a result of checking the preview image 620 of the message to be transmitted in the hold mode, a preset gesture can be input using the input device 200 to enter an edit mode for adding the content in the message.

In more detail, in response to a preset gesture applied using the input device 200, for example, the spatial position of the input device 200 being fixed at one point of the preview image 620 for a predetermined time and then moved quickly up/down based on the Z axis, in the hold mode, the controller 180 fixes an icon associated with a first operation corresponding to a previous touch on one area, for example, an upper center of the touch screen 151 and terminates the hold mode when an execution of the first operation is put on hold.

Accordingly, as illustrated in FIG. 6C, when an icon 620b associated with the first operation which has been put on hold is output, the message writing screen 602 is displayed again. When the user applies a touch to the transmit icon 610 after writing an additional message using the message writing screen 602, the hold mode is reactivated.

That is, when the spatial position of the input device 200 is moved away from a touch point of a succeeding touch applied to the object, namely, the transmit icon 610 output on the touch screen 151 and then detected within the reference range, the controller 180 can execute a second hold mode of putting on hold an execution of a second operation corresponding to the succeeding touch as well as the first operation corresponding to the displayed icon 620b.

In the second hold mode, information related to the operations which are on hold, namely, the first operation and the second operation, as illustrated in FIG. 6C, can be output on one window 640. In this state, when the spatial position of the input device 200 is moved out of the reference range, namely, the input device 200 is pulled, the first operation and the second operation are executed simultaneously or sequentially. For example, in FIG. 6C, a first-written message and an additionally-written message 630 are transmitted to a counterpart terminal at once.

As such, in the present invention, while an execution of an operation corresponding to a touch is put on hold, an additional operation associated with the operation currently on hold can be executed or the operation currently on hold can be cancelled based on the spatial position of the input device 200. Accordingly, even after a control command for executing a specific operation is input, whether or not the operation to be executed satisfies the user's intent can be checked once more and then the operation can be executed or an additional operation can be performed. In addition, an incorrect operation caused due to an incorrect touch can be minimized.

Figure 7A:
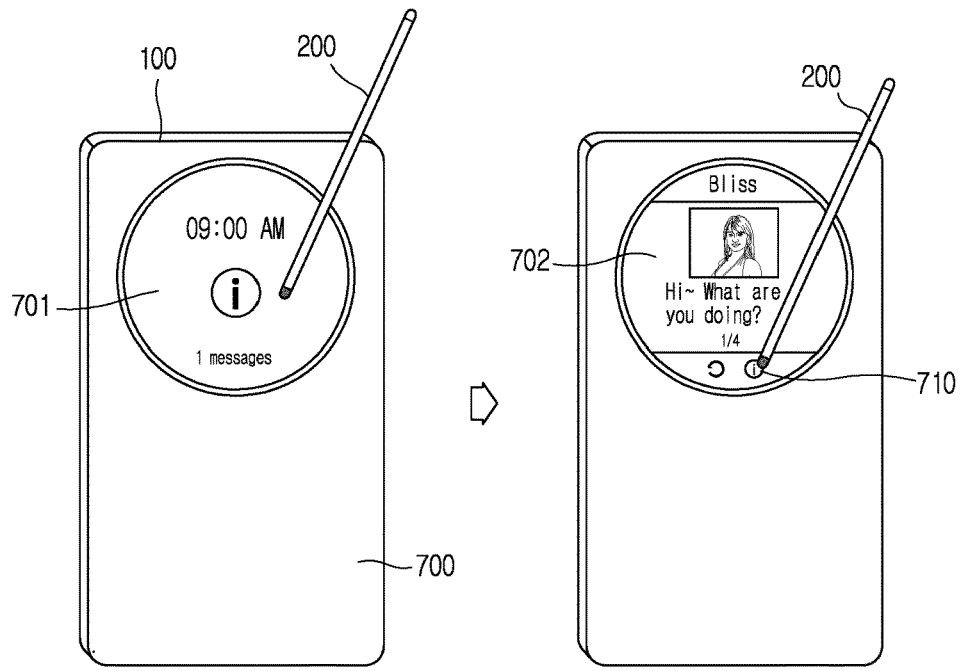
Figure 7A:
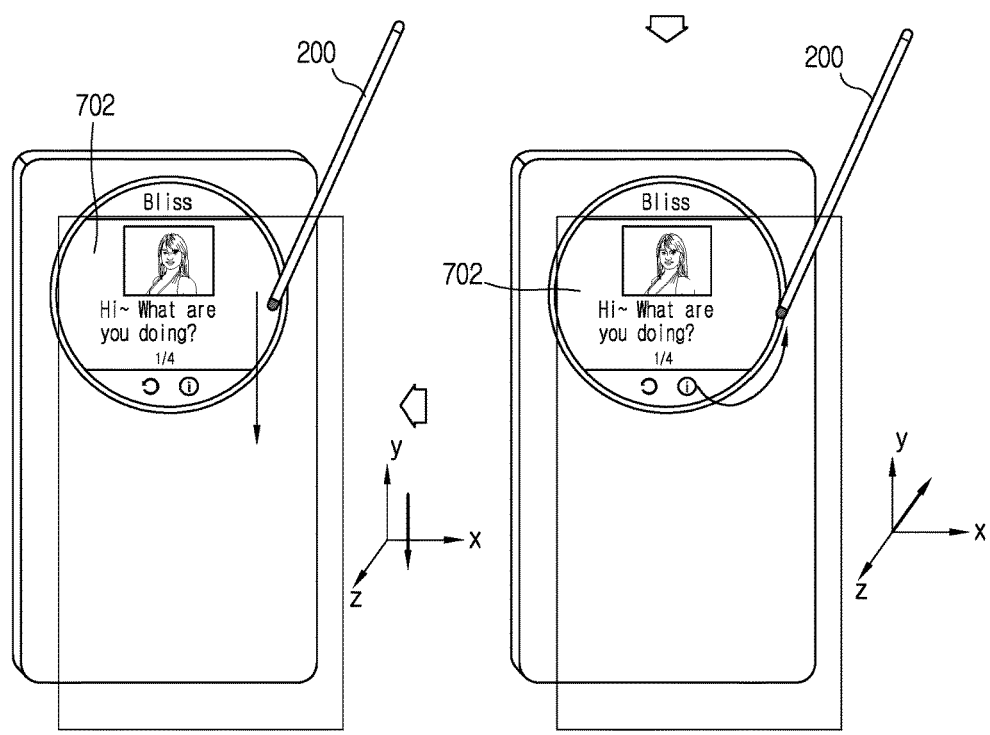
Figure 7B:
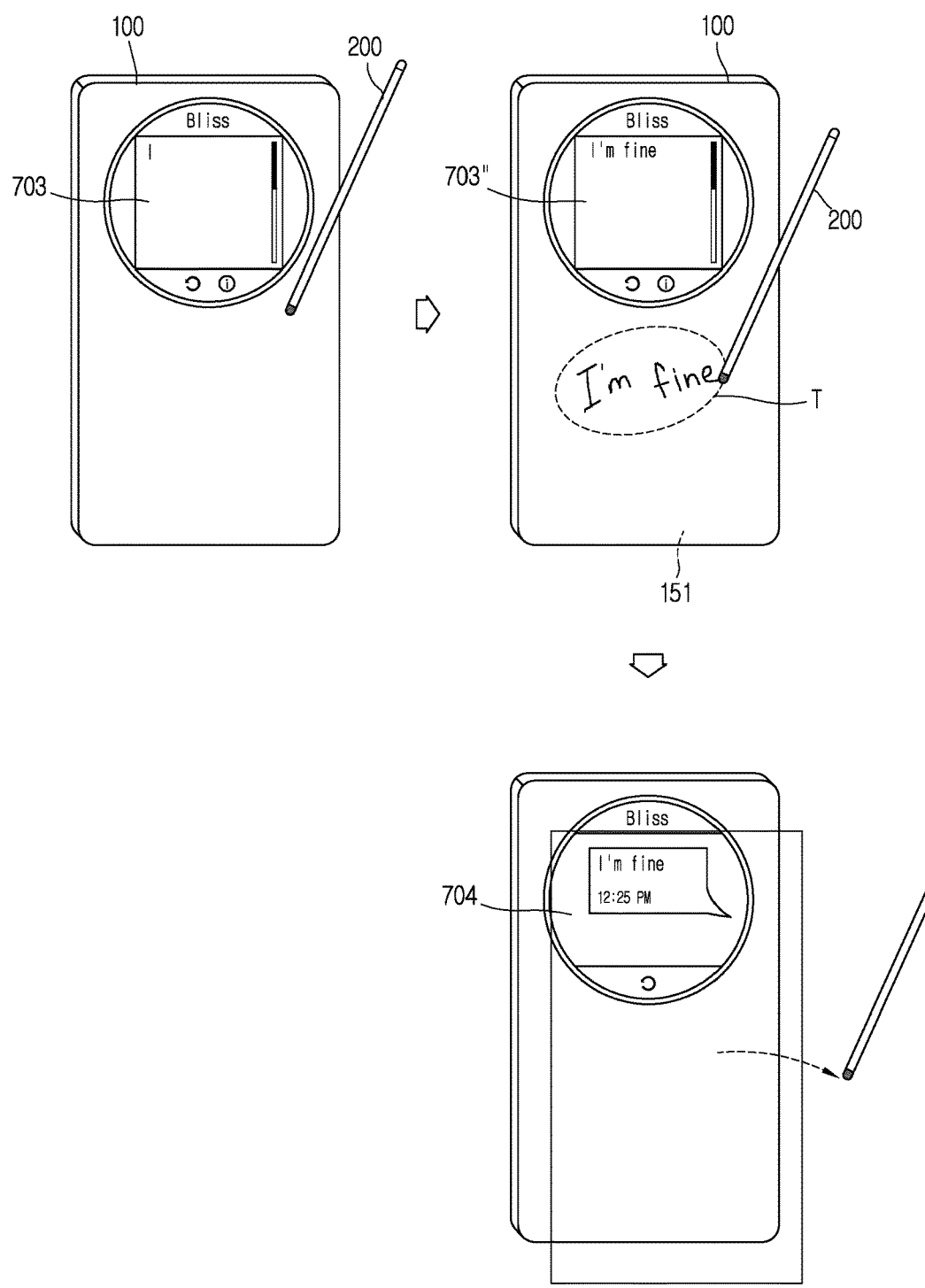

Next, FIGS. 7A and 7B illustrate an example implemented in the present invention when a cover 700 is coupled to a terminal frame of the mobile terminal 100. Here, the cover 700 may be opened or closed based on one side surface of the terminal body of the mobile terminal 100. Also, a hole is formed through a part of the cover 700, such that a part of the mobile terminal 100 is exposed through the hole. Accordingly, when the cover 700 is opened, the front surface of the touch screen 151 is exposed. When the cover 700 is closed, the part of the touch screen 151 is exposed through the hole and the other portion is obscured by the cover 700. This allows the user to check information output on one area of the touch screen 151 exposed through the hole even in the closed state of the cover 700.

As one example, notification information 701 notifying a reception of a message, as illustrated in FIG. 7A, can be output on one area of the touch screen 151 exposed through the hole. When a touch is applied to the notification information 701 or a notification icon using the input device 200, at least part 702 of contents of the received message is output on the one area of the touch screen 151 exposed through the hole.

In this state, to check the full message received, the spatial position of the input device can be slightly pulled in the Z-axial direction from a touch point of the touch applied to the notification information 701 or the notification icon, and then moved up, down, to left or and left so as to scroll the received message.

Meanwhile, for responding to the received message in the closed state of the cover 700, a touch can be applied to a message response icon 710 and the input device 200 can be slightly pulled. Accordingly, an input mode for writing a response message can be activated while maintaining the output state of the received message.

Upon the activation of the input mode, as illustrated in FIG. 7B, a message input screen 703 for writing the response message is output on the one area of the touch screen 151 exposed through the hole. Also, in the input mode, while the cover 700 is closed, the controller 180 can recognize an input (e.g., 'I'm fine') T handwritten on the cover 700 using the input device 200.

In more detail, the controller 180 can measure information related to the spatial position of the input device 200, namely, a moving distance, a moved degree, a moving track, a moving direction, inclination information and the like of the input device 200, based on magnetic field values detected through the plurality of three-axis magnetic sensors, and recognize a line, a figure, a character, a letter and the like corresponding to the measured information.

The controller 180, as illustrated in FIG. 7B, can then output at least part of the input handwritten on the cover 700 on the message input screen 703 exposed through the hole (703"). Next, when the spatial position of the input device 200 is moved away from the cover 700 based on the touch screen 151 to be out of the reference range, namely, the input device 200 is pulled after the handwriting, an operation associated with the handwritten input which is output on the message input screen 703" is executed. That is, the written response message 703" is transmitted to a counterpart terminal. Afterwards, a message transmission result 704 is displayed on the one area of the touch screen exposed through the hole.

According to the aforementioned embodiment, when the cover 700 closes the mobile terminal 100, a received event can be quickly checked through a small screen exposed through the hole, and an input handwritten on the cover 700 can be recognized so as to quickly and privately process a response to the event.

Figure 8A:
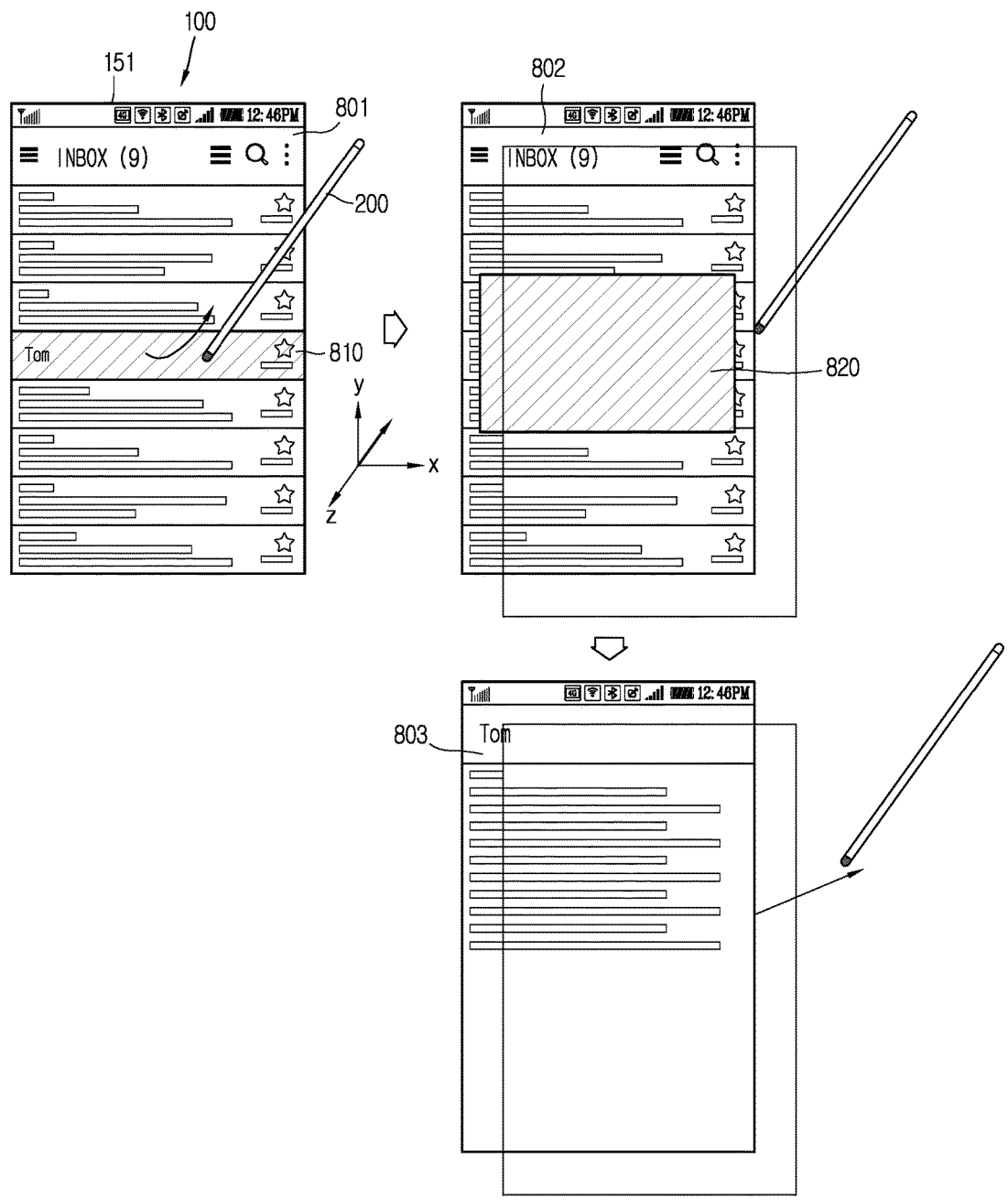

Next, FIG. 8A illustrates an example of deciding an execution degree of a hold mode based on an attribute of a touch applied to an object through the input device 200. In one embodiment, the controller 180 can decide an execution degree of a hold mode in a different manner based on at least one of a touch time and a touch degree of a touch applied by the input device 200 to an object (e.g., menu, icon, item, text, image, input area, etc.) output on the touch screen 151.

In more detail, in FIG. 8A, an execution time of a hold mode is decided in proportion of a touch time and/or touch pressure of a touch applied to a specific message item 810 by the input unit 200 on a message list screen 801. For example, when the specific message item 810 is pressed for two seconds using the input device 200 and then the input device 200 is pulled up, the hold mode can be executed for two seconds (802), and then automatically ended regardless of the spatial position of the input device 200. A selected item view 803 (a function of viewing the selected item) can thusly be executed.

Meanwhile, after presetting the shortest execution time (e.g., 1 second) of the hold mode, when it is detected that the touch time and/or touch pressure of the touch applied to the object is shorter than the preset shortest execution time, the hold mode can be executed as a default at least for the preset shortest execution time.

Figure 8B:
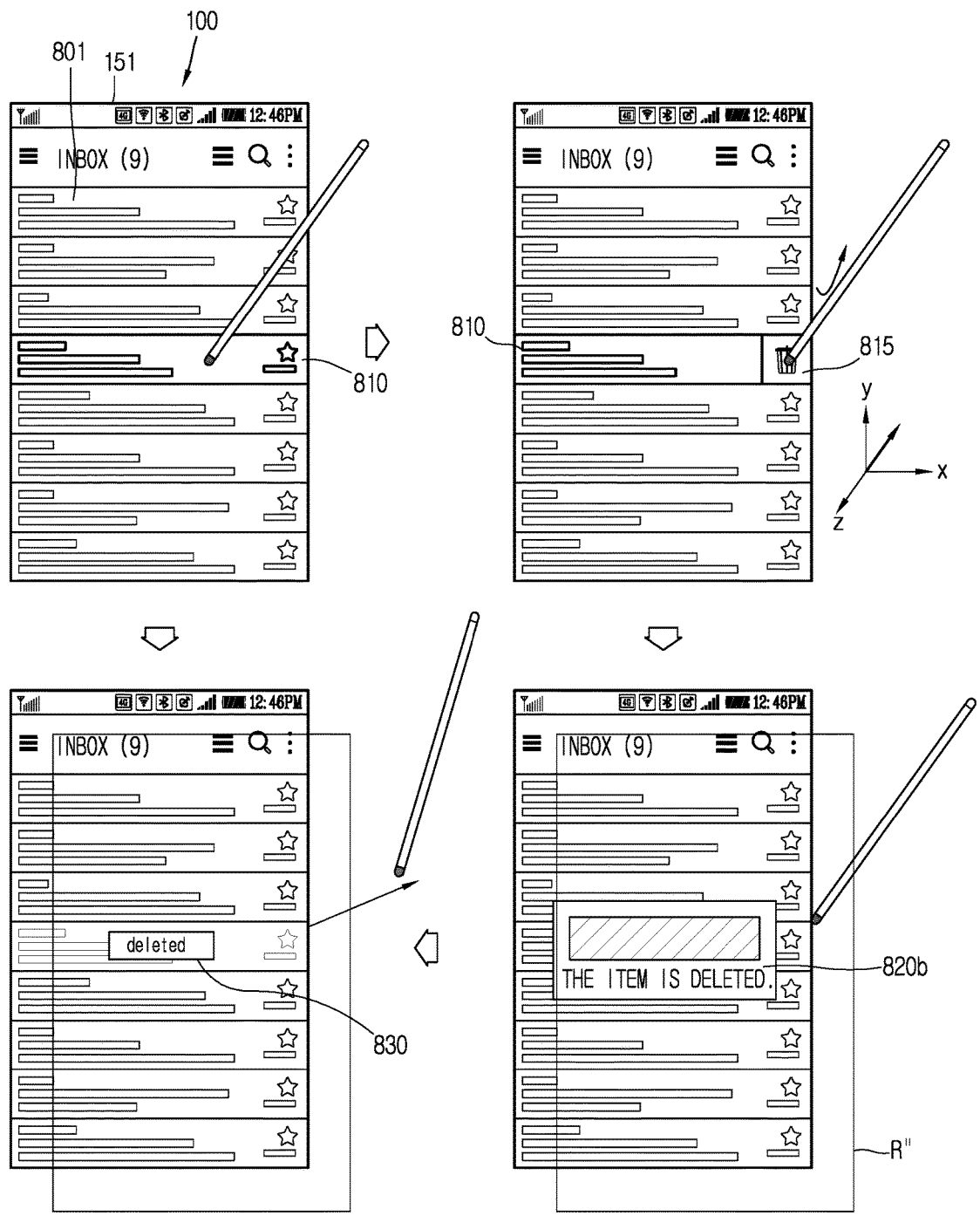

Next, FIG. 8B illustrates an example of outputting a hidden function with respect to the specific message item 810 in proportion to a touch time and/or pressure of a touch applied to the specific message item 810 on the message list screen 801. For example, when the specific message item 810 is pressed for two seconds using the input device 200, a delete icon 815 as a hidden function with respect to the item 810 can be output. FIG. 8B illustrates only one hidden function for the item, but with no limit to this, a plurality of hidden functions can alternatively be displayed.

In this state, when a succeeding touch is applied using the input device 200 to the delete icon 815 which notifies the hidden function and then the input device 200 is pulled in the Z-axial direction, a hold mode for executing a deletion of a selected item other than viewing the selected item (803) is entered. In the hold mode, when a predetermined time elapses (e.g., when a time for which a touch is applied to the delete icon 815 elapses) or the input device 200 is pulled out of the reference range, the corresponding item 810 is deleted from a list. A message 820b or 830 can be displayed indicating the message 810 has been deleted.

Also, in one embodiment, after entering the hold mode, when the spatial position of the input device 200 is very quickly changed or moved quickly out of the reference range, the controller 180 can determine it as the user's unintentional operation. Accordingly, the controller 180 can limitedly perform the hold mode again when the spatial position of the input device 200 is detected again within the reference range within a predetermined time (e.g., 1 to 2 seconds) or brought into contact with the touch screen 151.

Whether or not the spatial position of the input device 200 is very quickly changed can be estimated based on changed degrees of the magnetic field values detected through the plurality of three-axis magnetic sensors provided in the mobile terminal 100.

Figure 9:
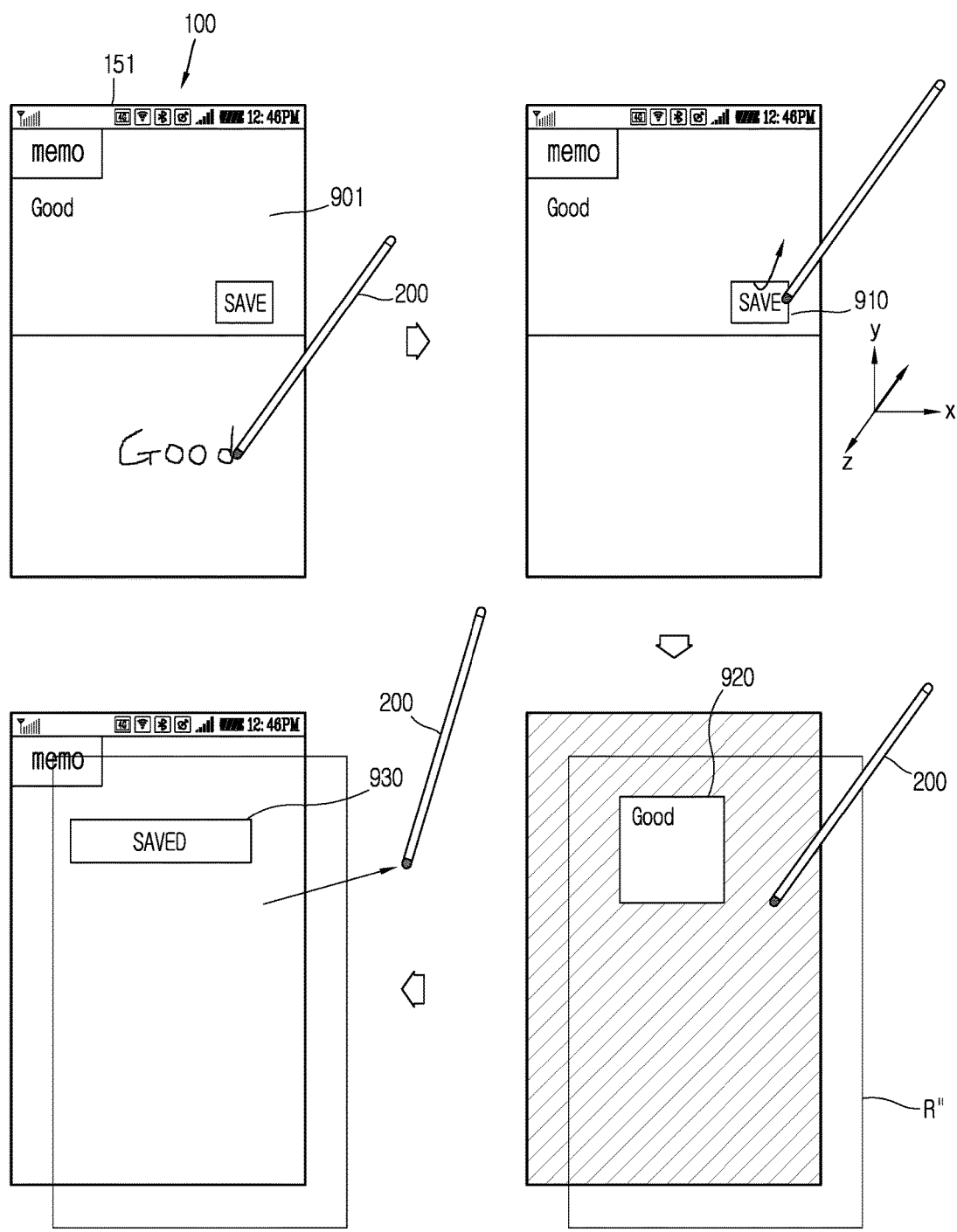

Next, FIGS. 9, 10A, 10B, 11, 12A and 12B illustrate various examples of information related to an operation execution of which is on hold in a hold mode. First, FIG. 9 illustrates an example of entering a hold mode, in response to a touch applied to a document saving icon 910 using the input device 200 being pulled from a touch point of the touch based on the Z axis, after writing the document 901. In the hold mode, as illustrated in FIG. 9, a window 920 on which contents of a document to be saved can be popped up. Also, the window 920 can further output thereon additional information, such as a location for saving the document, a written time of the document, etc.

In addition, according to a result after checking the contents of the document to be saved or the additional information, when desiring to change at least part thereof, the input device 200 is moved from a spatial position corresponding to an output area of the window 920 toward the window 920 based on the Z axis (it can be expressed as pushing the input device 200 in the Z-axial direction). Accordingly, the hold mode is ended when information output on the window 920 is output on the full touch screen 151. This allows the user to easily edit the information output on the window 920. When the input device 200 is pulled out of the reference range, the save operation is performed and message 930 is displayed indicating the same.

Figure 10A:
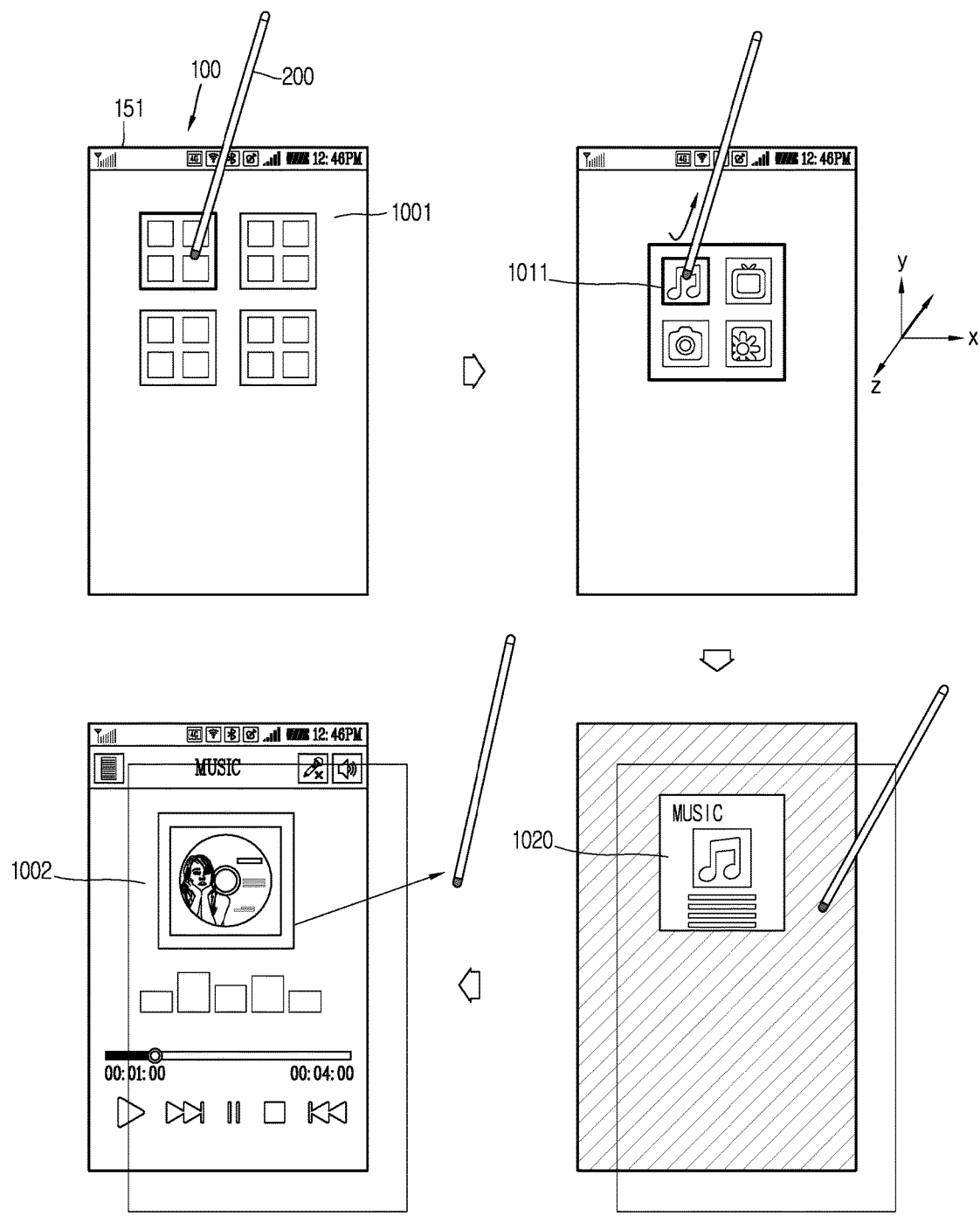
Figure 10B:
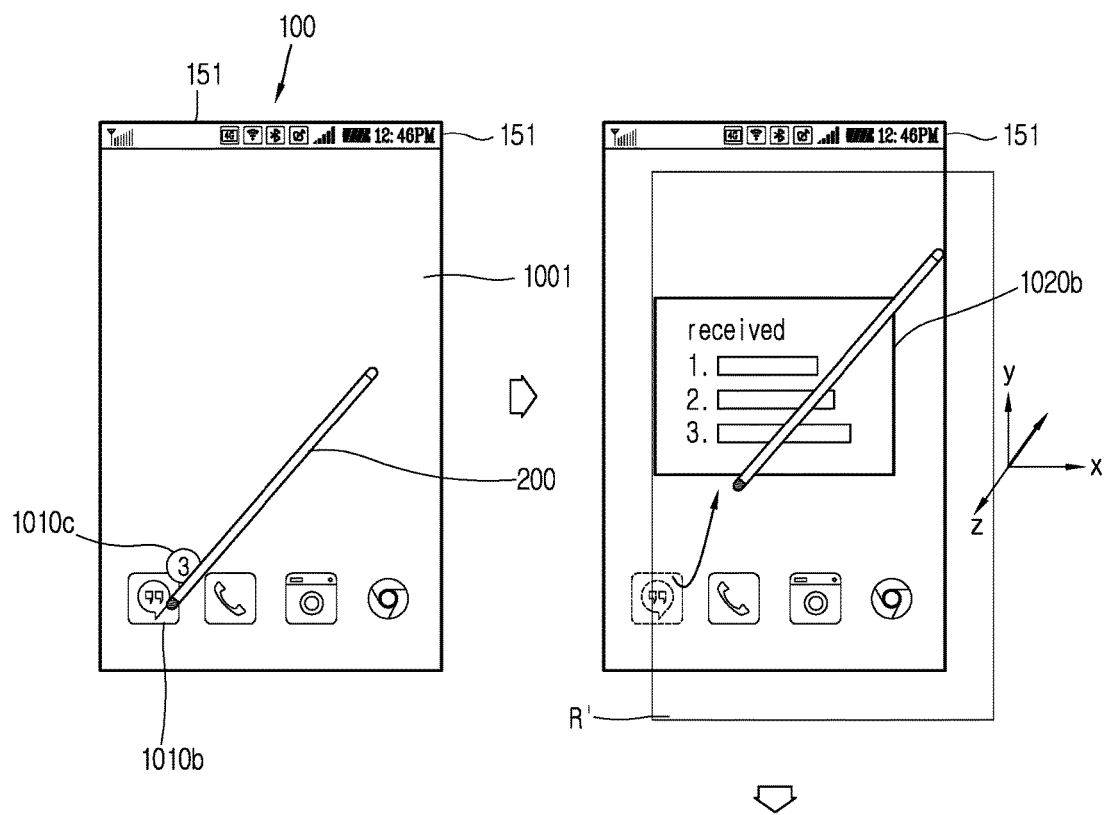
Figure 10B:
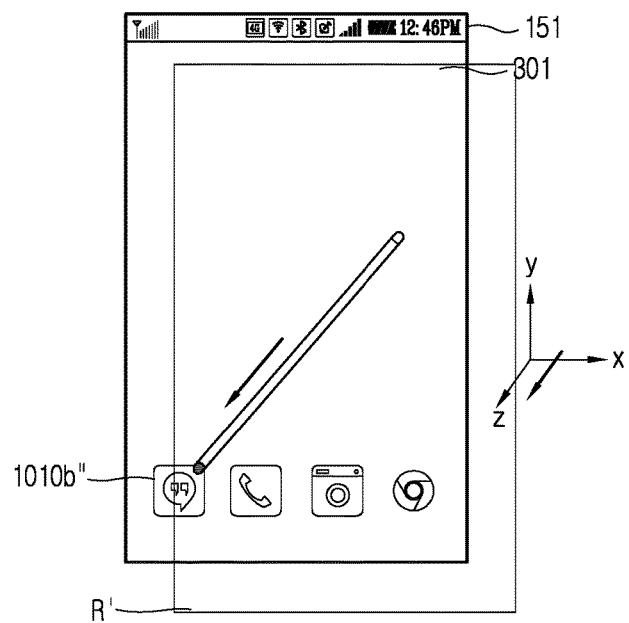

As another example, FIGS. 10A and 10B illustrate an example of entering a hold mode by pulling a touch applied to an icon of an application using the input device 200 from a touch point of the touch based on the Z axis. When an object touched by the input device 200 is an icon of an application, upon entrance into a hold mode, the controller 180 can output in advance execution information regarding the application.

Here, the execution information regarding the application includes basic information on the application, setting information, a recent execution time, an output position and output information at a terminated time point, and the like. The execution information regarding the application can be pre-stored in a preset storage space of the mobile terminal 100 so as to be known even without an execution of the application. Accordingly, upon entering the hold mode, the controller 180 can detect only the execution information regarding the selected application by accessing the preset storage space and output the detected execution information on the touch screen 151.

For example, as illustrated in FIG. 10A, when an icon 1011 of a sound source application is selected on a home screen 1001, and when the hold mode is executed in response to the input device 200 being pulled in the Z-axial direction, at least part of a sound source which has most recently been played in the sound source application can be played back. That is, without the execution of the sound source application, information saved at the moment of terminating the sound source application (i.e., the most recently played sound source) can be output in the form of a preview 1002.

As another example, as illustrated in FIG. 10B, when a notification icon 1010c notifying an event generation is output on an icon 1010b of a message application, and when the hold mode is executed in response to the input device 200, which has selected the icon 1010b of the message application, being pulled in the Z-axial direction, information related to the generated event can be output on a window 1020*b*. In this state, when the input device 200 is brought into contact again with the touch screen 151, the notification icon 1010*c* is not output any more on the icon 1010*b* of the message application. That is, as the information related to the event is output on the window 1020*b* which has been output in the hold mode, the user can check the event.

Meanwhile, the controller 180 executes the corresponding application at a time point that the spatial position of the input device 200 is moved out of the reference range. Further, as illustrated in FIG. 10A, in an output state of execution information 1020 regarding the application, when the input device 200 is brought into contact with one point of the touch screen 151, only the execution information 1020 regarding the application disappears without an execution of the application. Accordingly, the home screen 1001 or a selected folder is displayed again.

Figure 11:
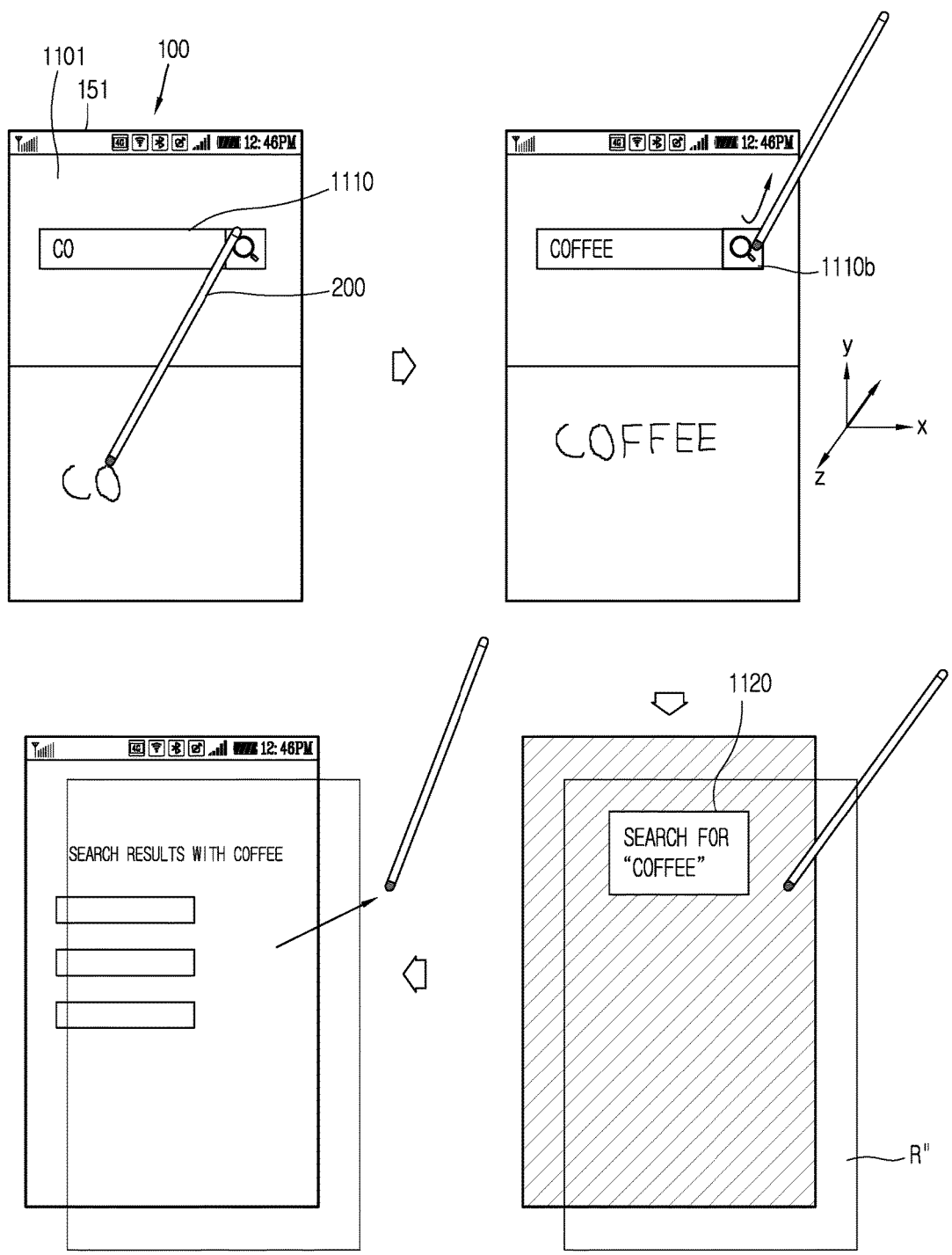

FIG. 11 illustrates an example of entering a hold mode by inputting a search word using the input device 200 on a search word input screen 1101 including a search word input field 1110 and then pulling a touch applied to a search icon 1110*b* using the input device 200 in the Z-axial direction. Upon entering the hold mode, a notification icon 1120, which notifies the input search word and a web search to be executed using the search word, can be output on the touch screen 151. In this state, when the input device 200 is pulled in the Z-axial direction to be out of the reference range, the web search is executed using the input search word (e.g., 'coffee'). Meanwhile, upon desiring to change the search word, the input device 200 is brought into contact with the touch screen 151. Accordingly, the search word input screen 1101 is output on the touch screen 151.

Further, when a typographic error is detected from the input search word, first information informing the detection of the topographic error and second information inducing a search using a corrected search word can be further output on the popped-up notification icon 1120 in the hold mode. For example, when the input search word is 'coofee,' a message, such as 'please pull down the input device if you want to search for using 'coffee,' can be output as an example of the second information. This results in omitting a step of inputting a correct search word again after outputting a wrong search result when the user executes a search using a search word with a typographic error for fast searching.

Figure 12A:
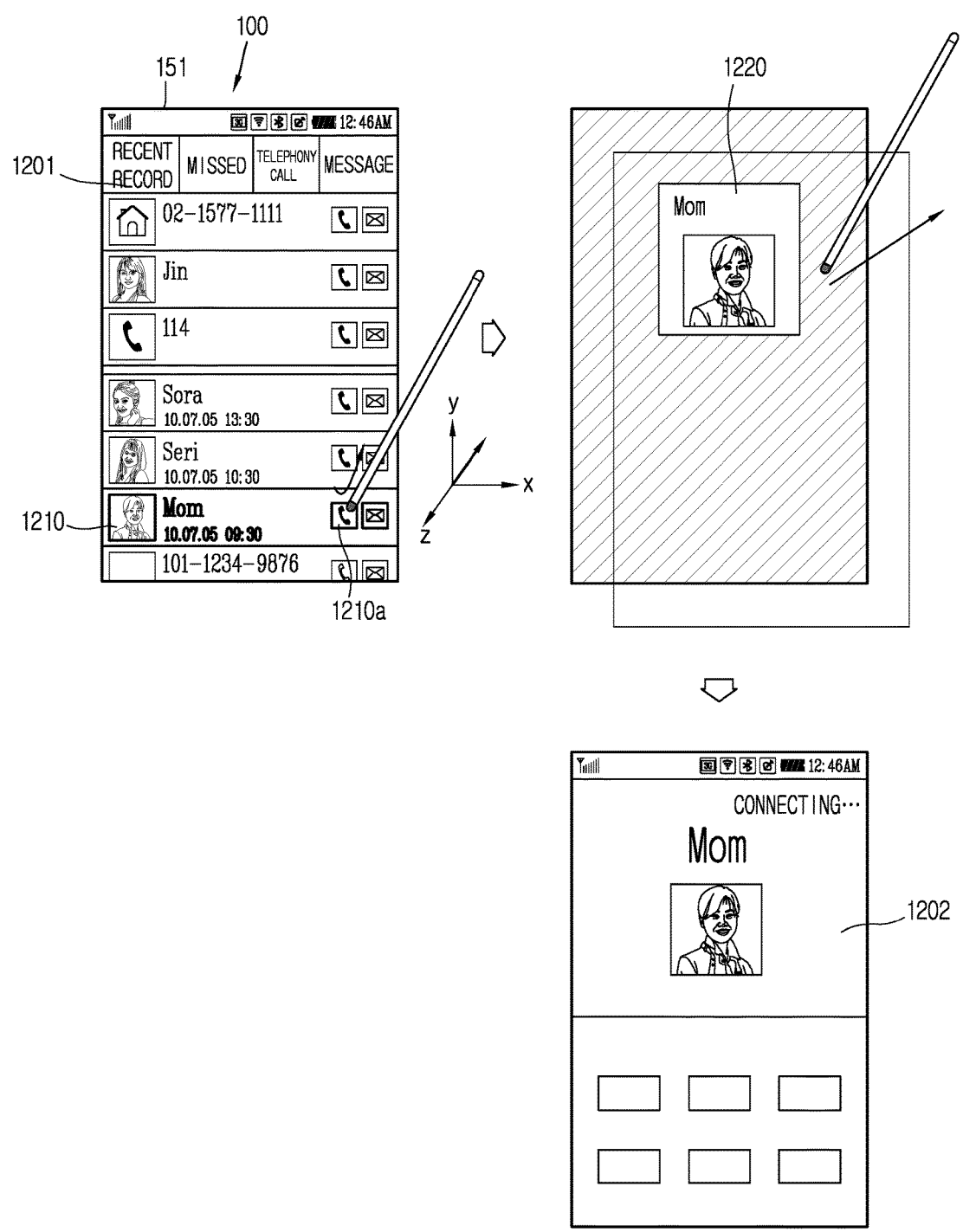
Figure 12B:
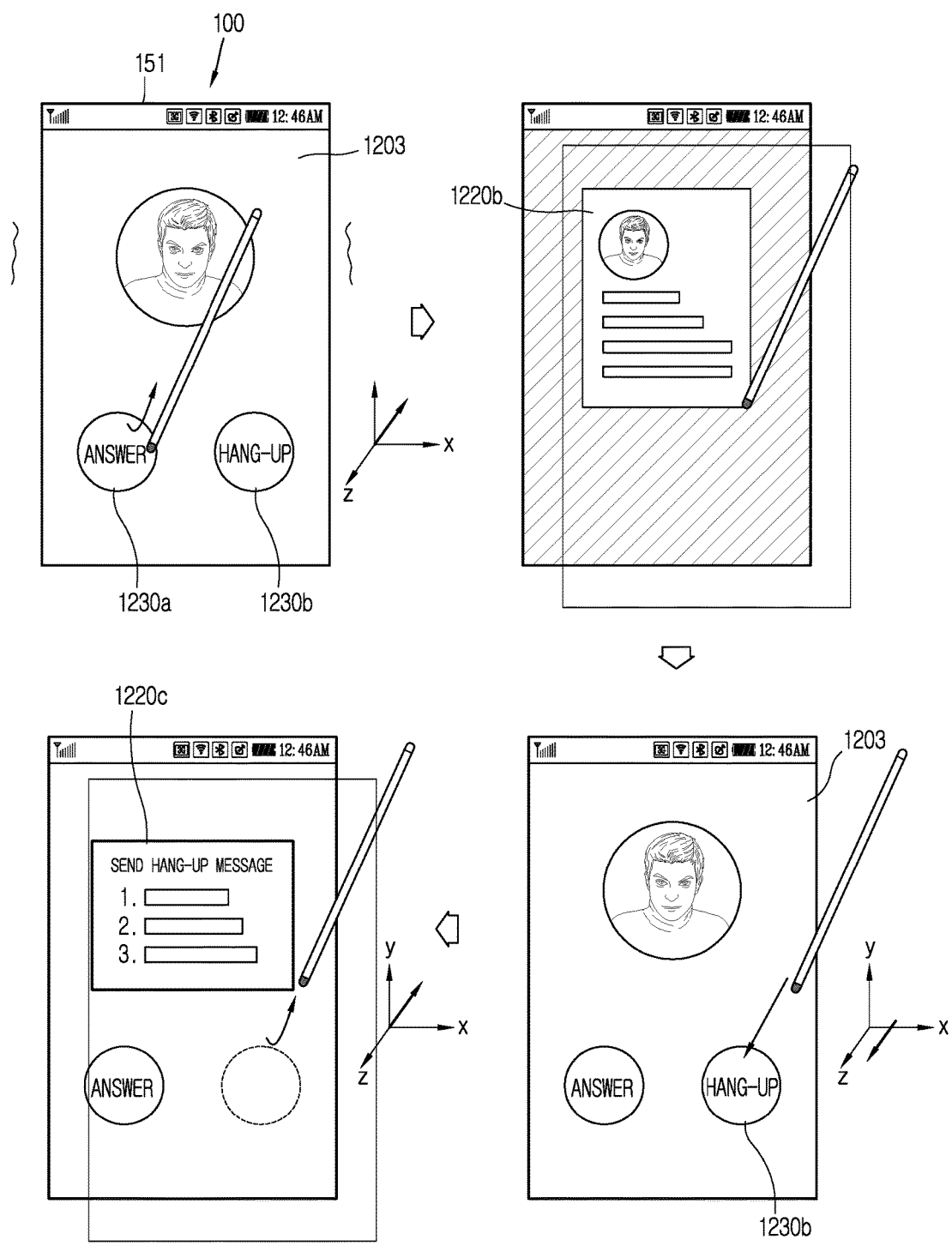

As another example, FIG. 12A illustrates an example of originating a call using the input device 200, and FIG. 12B illustrates an example of terminating a call using the input device 200. First, as illustrated in FIG. 12A, when a call list screen 1201 is output on the touch screen 151, when a touch is applied using the input device 200 to a call-placing icon 1210*a* included in a call list item 1210 with a specific person ('Mom') and then the input device 200 is pulled away from a touch point of the touch in the Z-axial direction, information 1220 regarding a counterpart (specific person) desiring to place a call thereto is popped up on the touch screen 151. Here, the information related to the counterpart includes information stored in a call application, such as an image, contact information and a recent call list, and also include information related to the same person stored in an associated another application (e.g., a recent message list, etc.).

As such, in the hold mode in which the information 1220 has been popped up, when the input device 200 is more pulled in the Z-axial direction and thus the spatial position of the input device 200 is moved out of the reference range, a call is placed to a terminal of the counterpart ('Mom') as shown on the screen 1202. Further, when the input device is pushed in the Z-axial direction to be brought into contact with the touch screen 151, the call to be placed to the counterpart terminal is cancelled and the call list screen 1201 is output again.

Also, as illustrated in FIG. 12B, when an 'answer' icon 1230*a* is touched using the input device 200 on a screen 1203 notifying the reception of a call and then the input device 200 is pulled from a touch point of the touch in the Z-axial direction, information 1220*b* regarding a counterpart who has oriented the call is popped up and an execution of an operation of a call receiving operation is put on hold.

In this state, when the input device 200 is pushed in the Z-axial direction to be brought into contact with the touch screen 151, the execution of the call receiving operation is cancelled and the screen 1203 is output again. In this instance, when a 'hang-up' icon 1230*b* is touched using the input device 200 and then the input device 200 is pulled from a touch point of the touch in the Z-axial direction, a hold mode in which an execution of a call hang-up operation is put on hold is executed. And, in the hold mode, a hang-up message list 1220*c* to be transmitted to a counterpart is output.

Next, after selecting one message from the hang-up message list 1220*c* by moving the spatial position of the input device 200 within the reference range, when the input device 200 is more pulled in the Z-axial direction to be out of the reference range, the transmission of the hang-up message to the counterpart is executed simultaneously with the call declining operation. This provides user convenience in terms of checking an operation desiring to execute one more time and simultaneously executing an associated additional operation after the check.

Figure 13:
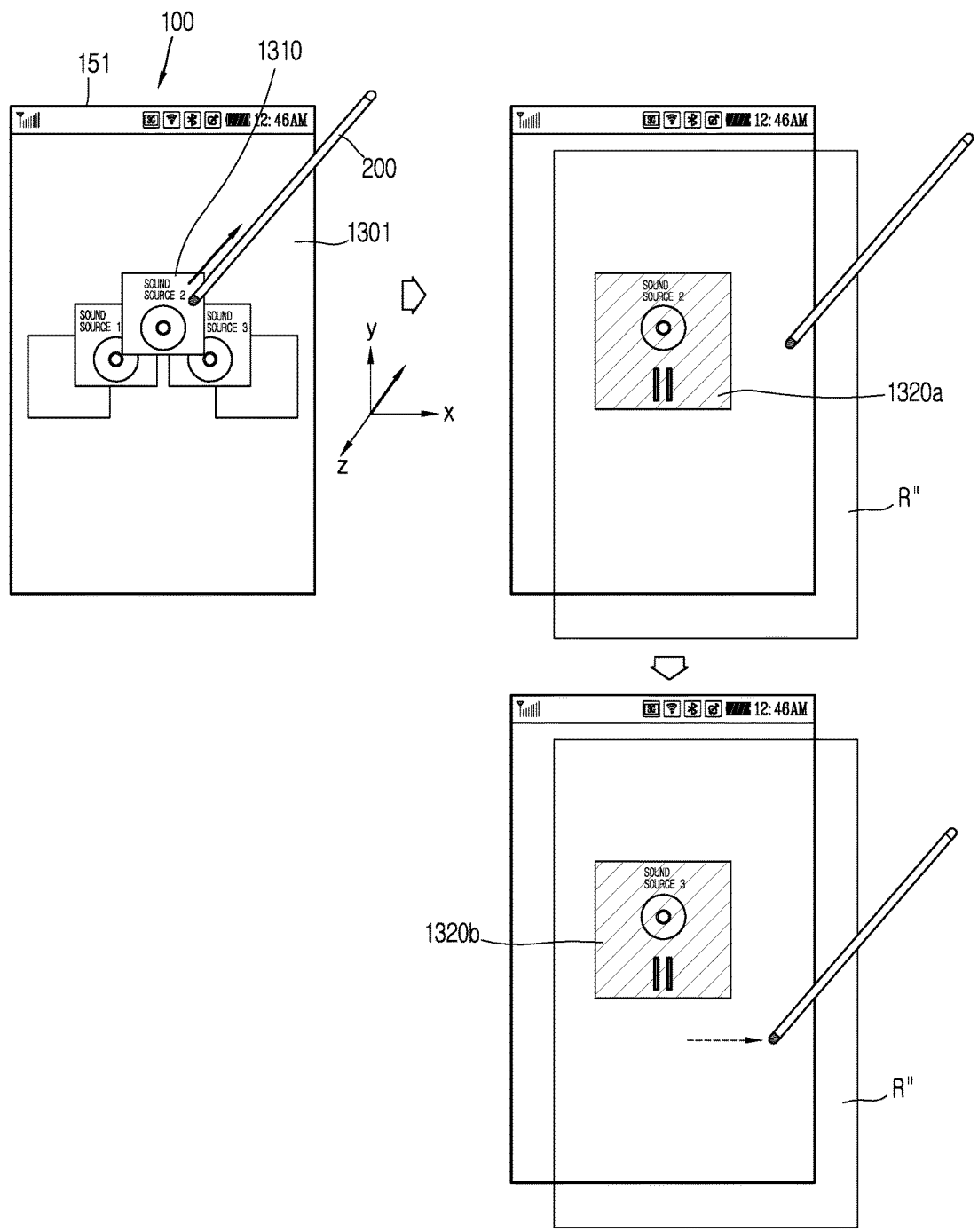

As another embodiment, FIG. 13 illustrates an example of quickly changing a specific operation on hold into another operation in a hold mode in which the execution of the specific operation is on hold. As illustrated in FIG. 13, when a sound source list screen 1301 having a plurality of sound sources to be played back is output, and when a specific sound source ('Sound source 2') is selected using the input device 200 and the input device 200 is pulled in the Z-axial direction, a hold mode in which an execution of the 'Sound source 2' is put on hold is executed.

In the hold mode, the controller 180 can output first preview information 1320*a* notifying an operation corresponding to the selection of the 'Sound source 2' in the form of a popup window. The first preview information 1320*a* includes a reproduction time, a title, a singer and a composer of the 'Sound source 2,' and even a preview-image/video associated with the sound source. Also, while the first preview information 1320*a* is output, a part of the sound source may be played back.

Next, in the output state of the first preview information 1320*a*, when the spatial position of the input device 200 is moved in one direction, for example, in the X-axial direction within the reference range, the controller 180 can select another sound source (e.g., 'Sound source 3') based on the moved direction, and switch the first preview information 1320*a* into second preview information 1320*b* notifying an operation corresponding to the selected another sound source (e.g., 'Sound source 3'). That is, a first operation execution of which has been put on hold in the hold mode is switched into an execution-holding state of a second operation different from the first operation while the hold mode is maintained. In addition, another sound source (e.g., 'Sound source 1') may also be selected or an upper/lower item may be accessed in the hold mode by moving the spatial position of the input device 200 in another direction (e.g., corresponding to a movement of the input device 200 in the Y-axial direction).

Accordingly, when the user incorrectly selects an item and then touches an execution menu, a reselection can be executed in a hold mode at once, without having to perform a process of moving back to a list screen and performing the reselection, thereby providing convenience to the user.

Meanwhile, in the switched state into the second preview information 1320b in the hold mode, when the spatial position of the input device 200 is pulled out of the reference range, the controller 180 can execute an operation corresponding to the switched second preview information 1320b. Accordingly, an execution screen of the 'Sound source 3' can be output on the touch screen 151.

Figure 14:
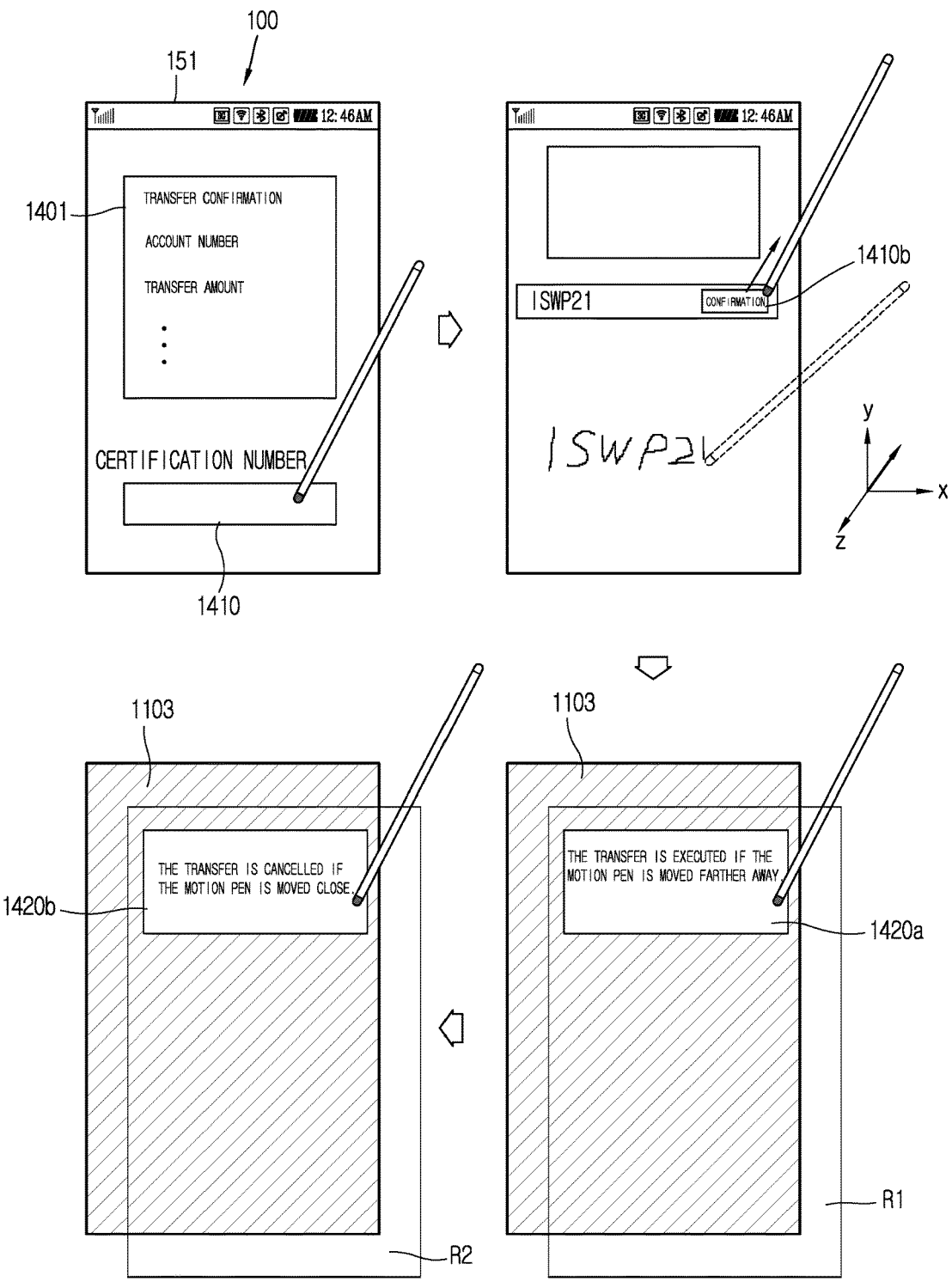

As another embodiment of the present invention, FIG. 14 illustrates an example of guiding an operation and a moving direction of the input device 200 for an additional operation in a hold mode. As illustrated in FIG. 14, after handwriting a certificate verification password 1410 using the input device 200 on a credit transfer execution screen 1401 for executing a credit transfer by executing a financial application, when an OK key 1410b is touched and the input device 200 is pulled, a hold mode in which an execution of the credit transfer is put on hold is entered.

In the hold mode, the controller 180 can guide an operation for executing/cancelling the execution of the operation which is on hold. In more detail, when the spatial position of the input device 200 is moved close to the touch screen 151 in a first direction within the reference range, the controller 180 can output first guide information 1420b inducing a cancellation of the execution of the operation which is on hold.

For example, as illustrated in FIG. 14, a message, such as 'the transfer will be cancelled if the motion pen is moved close' can be popped up on the touch screen 151. In this instance, whether or not the input device 200 has been moved in the first direction may be decided based on an initial spatial position of the input device 200 at the moment of entering the hold mode, or decided based on a position of a detailed area where the spatial position of the input device 200 is detected after dividing the reference range into a plurality of detailed areas based on the Z axis. For example, when the spatial position of the input device 200 is detected in an area R2 closer to the touch screen 151 among the detailed areas, the first guide information may be output.

Further, in the hold mode, when the spatial position of the input device 200 is moved in a second direction of moving away from the touch screen 151 within the reference range, the controller 180 can output second guide information 1420a inducing an execution of the operation which is on hold. For example, as illustrated in FIG. 14, a message such as 'the transfer will be started if the motion pen is moved away' can be popped up on the touch screen 151. This instance may be implemented under the condition that the spatial position of the input device 200 is detected in an area R1, which is further spaced apart from the touch screen 151, among the detailed areas.

Meanwhile, in one embodiment, for a certain object which gives priority to a fast execution of a function or when it is determined that a clear intent to execute an operation is made (e.g., a double-short touch input, etc.), the controller 180 can execute the hold mode for a preset short time, regardless of the position of the input device 200, in response to a touch being applied to an object using the input device 200 and then the input device 200 being pulled in the Z-axial direction.

Also, in one embodiment, when a touch is applied to an object using the input device 200 and then released without being pulled in the Z-axial direction, the controller 180 can output a popup window for checking whether to skip the execution of the hold mode or to execute the hold mode.

Also, the foregoing embodiments have been described under assumption that the input device 200 is pulled up based on the front surface of the touch screen 151, but the present invention is not limited to this. Within a range that the spatial position of the input device 200 is recognizable, even when the input device 200 is pulled back more or moved close to the terminal body based on the rear surface of the terminal body, the same/like embodiments may be applied.

As described above, the present invention can correctly recognize a spatial position of an input device only using a plurality of three-axis magnetic sensors provided in the mobile terminal 100, and execute a hold mode of putting on hold an operation corresponding to a touch applied to a touch screen using the input device for a predetermined time. This results in a one more check for an operation to be executed and minimization of an incorrect operation due to an incorrect touch and inconvenience resulting from a correction of such incorrect operation. Also, an associated additional operation can be executed and an operation which is on hold can be changed or edited in the hold mode, which results in fast executing the associated operation or a correction of an incorrect input.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal.

Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device, comprising:
a touch screen configured to display at least one graphic object for executing an operation on the electronic device;
at least first and second magnetic sensors configured to detect a spatial position of an input device emitting a magnetic field; and
a controller configured to:
in response to a touch applied to the graphic object using the input device for executing the operation, execute a hold mode of holding the execution of the operation while the spatial position of the input device is moved away from the touch screen while being maintained within a reference range, and
release the hold mode and execute the operation when the spatial position of the input device is moved out of the reference range, wherein the controller is further configured to execute an additional operation associated with the operation while the holding mode is executed, in response to the spatial position of the input device being moved a predetermined direction within the reference range.

2. The electronic device of claim 1, wherein the graphic object includes at least one of a menu, an icon, an item, text, an image and an input area for executing at least one function.

3. The electronic device of claim 1, wherein the controller is further configured to display a pop up window on the touch screen with information related to the operation when the operation is executed.

4. The electronic device of claim 3, wherein the information includes a preview image previewing the operation or detailed information regarding the operation.

5. The electronic device of claim 3, wherein the controller is further configured to output a feedback signal and display an animated image on the pop up window indicating the operation is being executed, in response to the spatial position of the input device being moved out of the reference range.

6. The electronic device of claim 1, wherein the controller is further configured to cancel the operation, in response to the spatial position of the input device being moved back toward the touch screen to be brought into contact with a specific point of the touch screen.

7. The electronic device of claim 1, wherein the controller is further configured to:
in response to the input device being fixed at one position within the reference range for a predetermined amount of time or more and then moved a specific direction within the reference range, display an icon on the touch screen corresponding to the held operation, and
in response to an input of additional command related to the held operation, adding contents related to the additional command to the held operation.

8. The electronic device of claim 1, further comprising:
a cover configured to cover the touch screen and including a window portion exposing a portion of the touch screen therethrough and a covering portion covering the touch screen,
wherein the controller is further configured to:
display at least part of the operation including a handwritten input on the touch screen through the exposed portion of the cover, and
execute the operation associated with the handwritten input in response to the spatial position of the input device being moved away from the cover and outside of the reference range.

9. The electronic device of claim 1, wherein the controller is further configured to execute the hold mode based on at least one of a touch time and a touch degree of the touch applied to the graphic object using the input device.

10. The electronic device of claim 1, wherein the controller is further configured to:
display a notification icon for the graphic object indicating notification information for the operation, and
display the notification information for the operation on the touch screen in response to the spatial position of the input device being moved away from the touch screen and within the reference range.

11. The electronic device of claim 1, wherein the controller is further configured to:
display first preview information of the operation being held,
switch displaying the first preview information into second preview information representing another operation to be executed, in response to the spatial position of the input device being moved in one direction while the first preview information is displayed, and
execute the other operation in response to the input device being moved out of the reference range while the second preview information is displayed.

12. The electronic device of claim 1, wherein the controller is further configured to:
display first guide information indicating the operation will be canceled if the spatial position of the input device is moved in a first direction closer to the touch screen within the reference range, and
display second guide information indicating the operation will be executed if the spatial position of the input device is moved in a second direction away from the touch screen.

13. A method of controlling an electronic device, the method comprising:
displaying, via a touch screen, at least one graphic object for executing an operation on the display terminal;
detecting, via at least first and second magnetic sensors, a spatial position of an input device having a magnetic field generating unit;
in response to a touch applied to the graphic object using the input device for executing the operation, executing, via a controller, a hold mode of holding the execution of the operation while the spatial position of the input device is moved away from the touch screen while being maintained within a reference range;
releasing the hold mode and executing, via the controller, the operation when the spatial position of the input device is moved out of the reference range; and
executing an additional operation associated with the operation while the holding mode is executed, in response to the spatial position of the input device being moved a predetermined direction within the reference range.

14. The method of claim 13, wherein the graphic object includes at least one of a menu, an icon, an item, text, an image and an input area for executing at least one function.

15. The method of claim 13, further comprising:
displaying a pop up window on the touch screen with information related to the operation when the operation is executed.

16. The method of claim 15, wherein the information includes a preview image previewing the operation or detailed information regarding the operation.

17. The method of claim 15, further comprising:
outputting a feedback signal and displaying an animated image on the pop up window indicating the operation is being executed, in response to the spatial position of the input device being moved out of the reference range.

18. The method of claim 13, further comprising:
cancelling the operation, in response to the spatial position of the input device being moved back toward the touch screen to be brought into contact with a specific point of the touch screen.

* * * * *